(12) United States Patent
Pannala

(10) Patent No.: US 12,681,475 B2
(45) Date of Patent: Jul. 14, 2026

(54) RADAR SENSOR-BASED BIO-INSPIRED AUTONOMOUS MOBILE ROBOT USING BLE LOCATION TRACKING FOR DISASTER RESCUE

(71) Applicant: Suma Gouri Pannala, Hyderabad (IN)

(72) Inventor: Suma Gouri Pannala, Hyderabad (IN)

( * ) Notice: Subject to any disclaimer, the term of this patent is extended or adjusted under 35 U.S.C. 154(b) by 56 days.

(21) Appl. No.: 18/388,260

(22) Filed: Nov. 9, 2023

(65) Prior Publication Data

US 2024/0077873 A1 Mar. 7, 2024

Related U.S. Application Data

(63) Continuation-in-part of application No. PCT/IB2022/052108, filed on Mar. 9, 2022.

(51) Int. Cl.
G05D 1/00 (2024.01)
G01S 5/02 (2010.01)

(52) U.S. Cl.
CPC .......... G05D 1/0212 (2013.01); G01S 5/0231 (2013.01); G05D 1/0246 (2013.01); (Continued)

(58) Field of Classification Search
CPC .. G05D 1/0212; G05D 1/0246; G05D 1/0257; G05D 1/027; G05D 1/0278; (Continued)

(56) References Cited

U.S. PATENT DOCUMENTS 8,255,092 B2 * 8/2012 Phillips ................... G06F 9/451
348/113
2006/0214622 A1 * 9/2006 Summer .............. B62D 57/032
318/568.12

(Continued)

FOREIGN PATENT DOCUMENTS

CN 106003064 A * 10/2016 ............ B25J 19/021
CN 210819567 U * 6/2020
(Continued)

OTHER PUBLICATIONS

Chen, J.; Li, S.; Liu, D.; Li, X. AiRobSim: Simulating a Multisensor Aerial Robot for Urban Search and Rescue Operation and Training. Sensors 2020, 20, 5223. https://doi.org/10.3390/s20185223 (Year: 2020).*

(Continued)

Primary Examiner — Anne Marie Antonucci
Assistant Examiner — Jordan T Smith
(74) Attorney, Agent, or Firm — Jose Cherson Weissbrot

(57) ABSTRACT

An autonomous bio-inspired mobile robotic device (200) capable of detecting, tracking and communicating location of survivor(s) (34) trapped under earthquake/building collapse debris (30, 32). The small-size, lightweight, ruggedized autonomous legged mobile robot (200) incorporates high-frequency millimeter-wave radar sensor (10) and Ultra Wideband (IR-UWB) radar sensor (12) for detecting presence and perform ranging of trapped survivor(s) (34). The autonomous mobile robot (200) also comprises GNSS (8) and BLE (4) connectivity for location tracking of trapped survivor(s) (34) in conjunction with a Wi-Fi enabled visual sensing solution (20) and a flashlight (16) to aid during rescue operation. The battery-powered (24) autonomous bio-inspired mobile robot (200) also comprises an MCU (26), actuators (14b), motor control circuitry (18) and IMU (6) to control robot (200) locomotion and perform sensor data fusion. BLE (4) connectivity solution of the present invention (200) communicates the location of detected trapped survivor(s) (34) to a plurality of rescue devices (44A, 44B, 44C) using Angle-of-Arrival (700)/Angle-of-Departure (800) method for successful survivor (34) location resolution.

7 Claims, 11 Drawing Sheets

(52) U.S. Cl.
CPC ........... *G05D 1/0257* (2013.01); *G05D 1/027* (2013.01); *G05D 1/0278* (2013.01); *G01S 2205/06* (2020.05)

(58) Field of Classification Search
CPC .... G01S 5/0231; G01S 2205/06; G01S 7/415; G01S 13/42; G01S 13/584; G01S 13/86; G01S 13/867; G01S 13/881; G01S 13/887; G01S 19/17; G01S 19/48; G01S 13/888; G01S 13/56; B25J 11/008
See application file for complete search history.

(56) References Cited

U.S. PATENT DOCUMENTS

| | | | | |
|---|---|---|---|---|
| 2017/0088261 | A1* | 3/2017 | Sequeira | G01S 13/0209 |
| 2019/0369641 | A1* | 12/2019 | Gillett | G05D 1/0088 |
| 2021/0080965 | A1* | 3/2021 | Starr | G05D 1/692 |
| 2021/0269149 | A1* | 9/2021 | Culver | B64U 10/60 |
| 2023/0089577 | A1* | 3/2023 | Huang | H04W 76/14 |
| | | | | 455/456.6 |
| 2025/0136206 | A1* | 5/2025 | Kojouharov | B62D 57/032 |

FOREIGN PATENT DOCUMENTS

| | | | | |
|---|---|---|---|---|
| CN | 211468615 | U | 9/2020 | |
| CN | 212556577 | U | 2/2021 | |
| KR | 101926557 | B1 * | 12/2018 | ......... G01S 13/0209 |

OTHER PUBLICATIONS

Machine Translation of CN210819567U (Year: 2020).*
Machine Translation of KR101926557 (Year: 2018).*
Machine Translation of CN106003064 (Year: 2016).*
Zhongying Zhao et. al, Acousto-optic positioning hexapod disaster relief robot, 2020 5th International Conference on Automation, Oct. 22, 2020, 135-139, IEEE.

\* cited by examiner

FIG. 2 Contd.

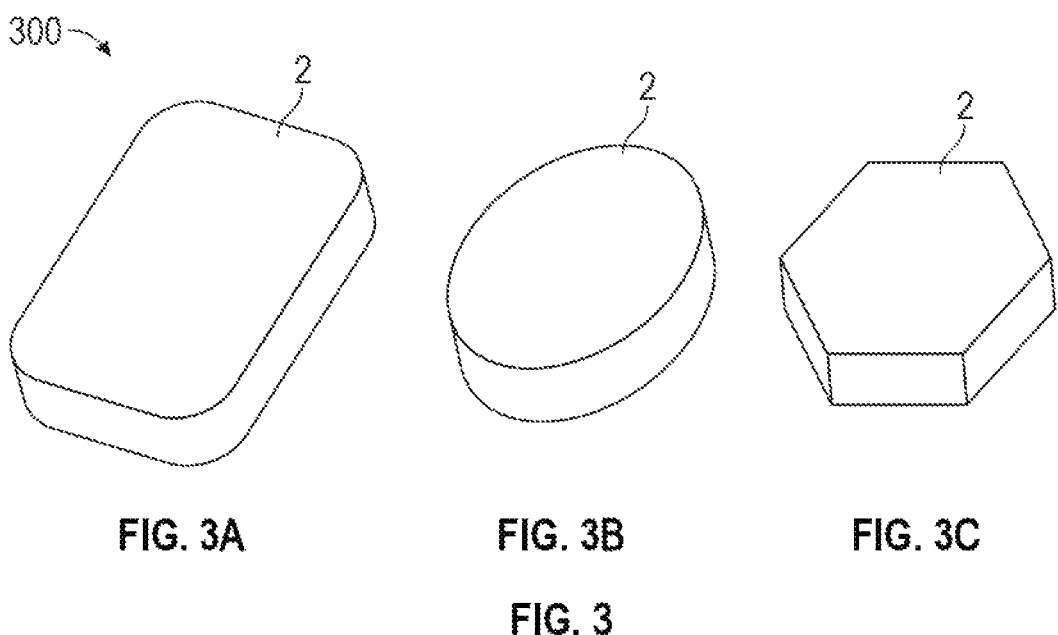
FIG. 3A     FIG. 3B     FIG. 3C
FIG. 3
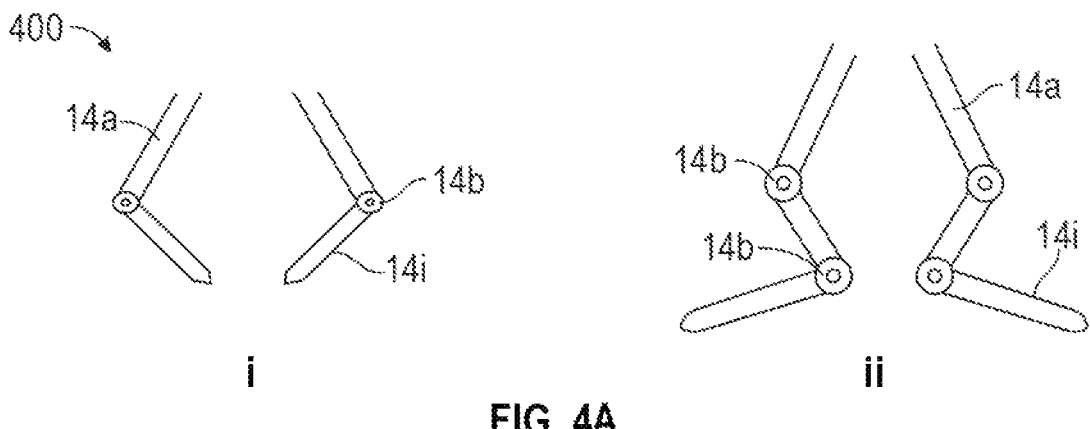
i     ii
FIG. 4A
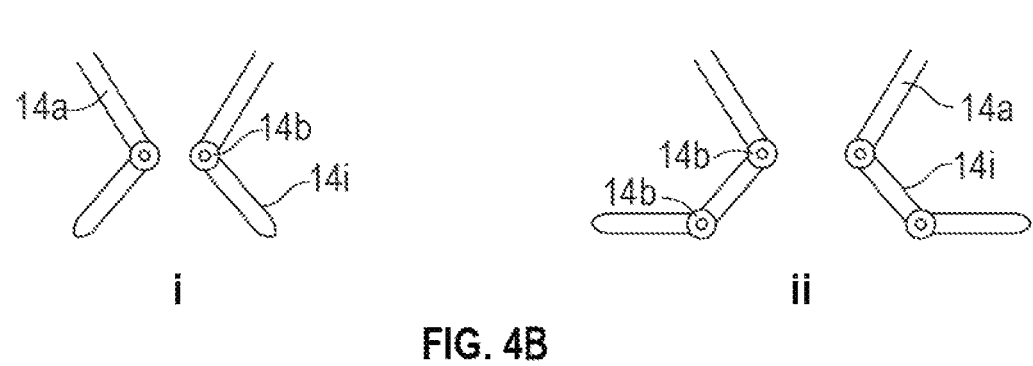
i     ii
FIG. 4B
FIG. 4

14i — Robot limbs

14b — Joints (Actuators)

18b

18 — Motor Control Circuit

18a

10 — mmWave Radar Sensor

222

12 — IR-UWB radar sensor

225

20 — 360° Camera (enabled with Wi-Fi)

20a — Retractable mount

223

MCU

26

44x — To Rescue teams

38 — BLE Antenna

224

4 — BLE Solution with antenna

226

8 — GNSS module

227

6 — IMU

228

16 — Flashlight

22a

28 — Voltage Regulation

28a

24 — DC Battery/ Power Supply

RADAR SENSOR-BASED BIO-INSPIRED AUTONOMOUS MOBILE ROBOT USING BLE LOCATION TRACKING FOR DISASTER RESCUE

FIELD OF THE INVENTION

The present invention relates generally to the field of electronics and mobile robotics and more specifically to the use of autonomous mobile robots incorporating presence detecting radar sensors and wireless connectivity technologies for search-and-rescue operation(s).

BACKGROUND OF THE INVENTION

The present invention relates to the design and method of use of a small-sized, lightweight, mobile, portable robotic device with sensing and location tracking and/or direction-finding capabilities, which may prove highly useful for detection of life trapped under debris, thereby tracking and saving trapped survivor(s), during search-and-rescue operations following earthquake(s)/building infrastructure collapse(s)/landslides(s)/avalanche(s).

When a calamity such as an earthquake or building collapse or a landslide occurs or avalanche occurs, human(s) and/or animal(s) sometimes get unfortunately trapped under the earthquake/building collapse/landslide debris. The areas where the survivor(s) may be trapped under the earthquake/building collapse/landslide rubble or debris may be inaccessible to rescue team(s) and/or to disaster (first) responder(s), which might include human personnel, canines or any other animate/inanimate rescue device(s).

During a disaster—natural or due to human error, rescue team(s), human labour, (dogs) canines, and/or other such rescue resources may be employed for search and rescue operations. However, resources such as human personnel, canines, etc., might not really be the most effective solution for detecting and saving survivor(s) trapped under earthquake/building collapse/landslide debris, considering the fact that canines may not be able to distinguish between live species and inanimate matter, also not all rescue device(s) may be effective in detecting and/or tracking trapped survivor(s). Also, canines and/or rescue devices may not be able to successfully and thoroughly navigate through challenging environments such as uneven terrain, nooks, crevices, piles of broken brick, mortar, concrete, broken glass, etc.

Since saving lives is of paramount importance during such critical times, there arises a need for a small, portable and lightweight easy-to-use search and rescue system that may be designed to be relatively easily maneuverable, such that the device/system may be able to successfully navigate and move through crevices, nooks, and corners under the debris in order to detect, track and potentially help save survivor(s) trapped under such debris.

The present invention aims to imitate the body design of segmented arthropods by designing an autonomous robotic device, incorporating mobile leg segments (driven by actuators), which help make the robot mobile, due to the locomotion-providing capability of actuator-driven leg segments. This may be a very important aspect that may be leveraged in search-and-rescue operations, in order to enable the robot to move through tiny nooks & corners under earthquake/building debris.

The cue to create, innovate, and design easily maneuverable search-and-rescue systems can be taken from Mother Nature. Mother Nature has created and designed certain species such as segmented arthropods whose body design enables them to very easily move through tiny unreachable crevices, maneuver through nooks & dark corners, and navigate on uneven terrain, where other species' body design may not allow them to be able to navigate such complex environments with similar ease. It is for this purpose that bio-inspired species' body design has been the main inspiration for the design of the present invention, in order to be able to aid in search-and-rescue operations following seismic catastrophes/building collapse(s)/landslide disaster(s).

The present invention therefore aims to combine an autonomous robotic device capable of locomotion as such, along with the capabilities of live presence detection technology/detection device(s)/sensing device(s)/sensing system(s) for the purpose of human detection (or sometimes even animal detection) in conjunction with the direction-finding and/or location tracking capabilities of Global Navigation Satellite Systems (GNSS), Ultra Wide-Band (UWB) and Bluetooth® Low Energy (BLE) system(s) in order to determine the location of trapped survivors and communicate the location information of survivors to rescue teams for ensuing rescue and needful action.

Earlier/existing implementations/idea(s) or previous device(s) on using rescue device(s) for relief operation(s) following earthquake(s) and/or building collapse(s) and/or landslide disaster(s) may have been used or may be still existing till date. While such idea(s) and/or product(s) may nevertheless be quite instructive and technologically relevant pertaining to the field of rescue devices, these idea(s) and/or product(s) may not have been based/are not based on ruggedized, small-sized, lightweight autonomous rescue devices that may be mobile, having their own locomotion and/or be portable and which may use the capability of hybrid sensor technologies such as combination of high-frequency radar sensors such as live presence millimeter-wave radar sensing, in conjunction with UWB connectivity, location-tracking GNSS technology and/or low power-consuming Bluetooth® Low-Energy (BLE) technology plus camera video/images and inertial sensor data for survivor detection and location tracking of trapped survivor(s).

The motivation behind using high-frequency radar sensors for human detection/presence detection in the present invention is that high-frequency radar sensors such as millimeter-wave radar sensors have certain clear advantages compared to other sensing technologies such as Ultrasonic or InfraRed or PIR sensors. Ultrasonic/InfraRed/PIR sensors may detect humans/animals only when the human survivor(s)/animal survivor(s) might be moving and may not be able to detect human survivor(s)/animal survivor(s) while they are stationary or static. The detection device(s) used in the present invention is a millimeter-wave radar sensor solution operating within the frequency range of 30 GHz-300 GHz and UWB radar sensor operating in the frequency range of 3.1 GHz-10.6 GHz with a bandwidth (BW) of 500 MHz-1.3 GHz. Depending on the operating frequency of the radar sensor used, the radar sensor may be able to detect the slightest change in live human/animal (hereafter referred to as "survivor(s)") movement with great accuracy and precision.

Detecting stationary survivor(s) becomes highly critical when they may be lying unconscious, weak and/or unmoving and stationary under debris. Using millimeter-wave radar sensor and IR-UWB radar sensor as live presence detection solutions in the present invention may be of unprecedented, unparalleled use and help in detecting stationary, moving or slightly moving survivor(s) stuck under debris. Another advantage of using millimeter-wave radar sensors is that most detection sensors can be used only in good lighting, but millimeter-wave radar sensors may also be used in dark environments without much lighting. Millimeter-wave radar sensors and UWB radar sensors can also easily penetrate through brick, wall (or wall collapse(s)), concrete, glass, mortar, dust, etc. Millimeter-wave radar sensors can additionally detect/sense through harsh and challenging environmental and inclement weather conditions such as fog, haze, dust, smoke, snow, etc.

Millimeter-wave radar sensors and UWB radar sensors might also be able to aid in location detection, distance-estimation, direction (angle) estimation—a characteristic which might be well exploited during use-cases, such as when an earthquake strikes and survivors may need to be located using sensing technologies which complement location-tracking connectivity technologies.

Since Global Navigation Satellite systems (GNSS) such as Global Positioning Satellite (GPS) systems may not be able to completely reach and/or track the location of survivor(s) trapped underneath earthquake debris/building collapse due to RF propagation losses, building, brick attenuation, etc., complementing connectivity schemes such as UWB positioning solutions as well as Bluetooth® Low Energy-based indoor positioning, Real Time Location Services (RTLS), may be used in addition to GNSS to track and locate the survivor(s) trapped underneath the earthquake debris/building collapse debris.

Ultra Wide Band (UWB) technology has been chosen for this present invention, since it is an accurate, secure and reliable detection and location tracking and positioning technology using 2 nanosecond-spaced pulses. UWB is a connectivity technology competent in providing ranging information using Time-of-Flight (ToF) method (can provide up to centimeter-level ranging accuracy depending on the output power of the UWB solution) and direction of survivor position, relative to the present invention using Angle-of-Arrival scheme. UWB solution used in the present invention can be optimized for low-power consumption.

Bluetooth® Low Energy (BLE) location-tracking technology has been chosen for the present invention because it is less power-consuming compared to other connectivity solutions. Previous earthquake rescue solutions do not combine advanced state-of-the-art radar sensor-based human sensing/presence detection technologies/detection device(s) together with the capabilities of GNSS location-tracking and UWB positioning techniques in conjunction with Bluetooth® Low Energy connectivity technology for the purpose of earthquake survivor's location tracking and/or direction-finding.

Therefore, in order to overcome the above mentioned drawbacks, there is a great need to develop and design a small form-factor, lightweight, battery-operated portable, ruggedized autonomous mobile robotic device incorporating high-performance live presence detection sensors for the purpose of survivor detection, while also simultaneously leveraging the capabilities of GNSS location tracking & UWB positioning technology together with low-power-consuming location tracking and direction-finding Bluetooth® Low Energy technology.

SUMMARY OF THE INVENTION

The cue and inspiration to create, innovate and design small-sized and easily maneuverable search-and-rescue devices/systems can be taken from Mother Nature. Nature has created and designed certain species such as segmented arthropods whose body and limb design enables them to very easily manoeuver through unreachable crevices/nooks/corners/crannies. The lithe body design of certain biological species such as insects and arthropods may enable them to navigate on/around rough uneven terrain and to manoeuver on/around complex environments with ease.

The present invention relates to a small-sized, lightweight, inexpensive, transportable and ruggedized bio-inspired autonomous mobile robotic device with bio-inspired jointed segmented limbs. The bio-inspired mobile robotic device of the present invention may incorporate live presence detection radar sensors, navigation and positioning sensor(s) (solutions), visual sensing solution(s) and wireless connectivity solutions; to aid in search-and-rescue operation(s) following seismic disaster(s)/building collapse(s)/infrastructure collapse(s)/avalanche disaster(s)/landslide(s)/flood(s), etc., by detecting survivor(s) trapped in/around/under debris and/or by detecting survivor(s) behind walls and by locating detected trapped survivor(s) and by communicating the location of detected trapped survivor(s) to rescue team(s).

The present invention aims to leverage the dexterity and maneuverability of arthropods and/or insects and other such lithe creatures by designing a bio-inspired mobile robotic device that mimics the body and limb design of certain biological species, such as segmented arthropods.

The present invention aims to design a bio-inspired autonomous mobile robot incorporating radar sensing/detection solution(s) such as microwave radar sensor/millimeter-wave radar sensor and/or Impulse Radio Ultra-Wide-Band (IR-UWB) radar sensor, together in conjunction with connectivity solutions such as Bluetooth® Low Energy (referred to as Bluetooth LE or BLE) technology and Global Navigation Satellite Systems (GNSS) technology onto an autonomous mobile robotic device, for the purpose of detecting and locating survivor(s) (34) trapped beneath earthquake/building collapse/landslide debris/behind walls for search-and-rescue operations.

The present invention comprising the mobile robot may be equipped with on-board rotating 360° visual sensing solution(s) mounted on a vertical retractable pedestal (such as a swivel unit and/or pan/tilt unit) affixed to the mobile robot for capturing 360° panoramic video footage/image(s) of the disaster scene to be sent via Wi-Fi to the rescue teams. The invention may also house a flashlight for illuminating the disaster scene and/or to facilitate excavation of survivor(s) by the rescue teams in challenging visual conditions. The present invention may also house at least a 6-axis Inertial Measurement Unit sensor (IMU) to aid in the purpose of mobile robot's (i.e., the invention's) localization and self-orientation within the disaster site/rescue site.

In accordance with an aspect of the present invention, the present invention may incorporate a microcontroller unit (MCU) which may be used to control movement of the mobile robot, program how and when the present invention responds to external stimuli, analyze on-board sensor data, and process survivor detection data and survivor location information. The present invention may also house components required for its correct operation and performance such as battery, voltage regulation unit(s) and any such parts/circuits/components that may be required to protect the hardware and functioning of the present invention.

In accordance with an aspect of the present invention, the present invention may be designed as a robot chassis (body) and wherein the mobile robot body/chassis of the present invention may incorporate plurality of limbs on the mobile robot chassis of the invention. The bio-inspired limbs of the mobile robot of the invention may be segmented, wherein each limb of the mobile robot may be designed as having at least 2 segments and wherein two consecutive segments may be connected to each other by at least one sensing/actuator-driven joint. The limbs of the mobile robot may be appended and/or attached and/or screwed and/or fixed and/or hinged to the mobile robot body (mobile robot chassis), thereby facilitating locomotion of the mobile robot of the present invention and to enable the present invention/mobile robot to navigate and manoeuver in/around/across/through terrain rendered rough, harsh and/or challenging by the debris/devastation. The bio-inspired limbs of the mobile robot of the present invention may enable the mobile robot/present invention to be able to move in/through environments, including but not limited to: nooks, crannies, crevices, deep inaccessible recesses, etc., to search and scout for survivor(s) who may be trapped under the debris caused by the disaster(s) and/or to search and scout for survivor(s) who may be trapped behind (collapsed) walls.

In accordance with an aspect of the present invention, for the purpose of live presence detection, the present invention may be incorporated with at least one radar sensor operating in the frequency range of 3 GHz-300 GHz in/on the bio-inspired autonomous mobile robotic device of the present invention. The radar sensor(s) that may be used in the invention for the purpose of live survivor detection may include, but not be limited to: microwave radar sensors (operating in the frequency range of 300 MHz-30 GHz) and/or millimeter-wave radar sensor(s) (operating in the frequency range of 30 GHz-300 GHz) and/or Impulse Radio Ultra Wide Band (IR-UWB or UWB) radar sensor(s) (operating in the frequency range of 3.1 GHz-10.6 GHz).

Microwave radar sensor(s) and mmWave radar sensor(s) and/or IR-UWB radar sensor(s) may have the ability to detect vital signs (such as heart beat rate, respiration rate, breathing rate) of a live human in a contactless (unobtrusive) manner, from a distance. IR-UWB radar sensor(s) may have the ability to detect live survivor(s) trapped behind walls, since the penetration capabilities of IR-UWB radar sensor(s) may be high, owing to the use of high bandwidth on the order of 500 MHz-1.4 GHz. Millimeter-wave radar sensor technology and/or UWB radar sensor technology may have environmentally resilient capabilities, since they are unaffected by dust, smoke, rain, haze, snow, fog, and/or low lighting conditions, and may also be able to penetrate through dry wall, concrete, gypsum, glass, mortar, etc. These features of millimeter-wave radar sensor technology and IR-UWB radar sensor technology greatly justify the use of radar sensor(s) incorporated in/on a mobile bio-inspired robot of the present invention to aid in disaster search-and-rescue operations.

In accordance with another aspect of the present invention, millimeter-wave radar sensor(s) and/or UWB radar sensor(s) housed in/on the present invention may also be used to provide accurate, secure and reliable assessment of survivor(s)' range, survivor(s)' direction (angle), target(s) (survivor(s)') velocity (in case of movement of survivor(s)) and/or survivor(s)'s angle-of-arrival (AoA) information relative to the present invention. UWB is a detection and connectivity technology which uses 2 nanosecond-spaced pulses and may be competent in providing ranging information using Time-of-Flight (ToF) and/or (AoA) method and may provide up to centimeter-level ranging accuracy depending on the output power of the UWB sensor used in the present invention. mmWave radar sensor(s) may provide upto sub-millimeter level accuracy of the survivor location with respect to the present invention's location within the disaster site.

In accordance with an aspect of the present invention, the present invention may incorporate at least one visual sensing solution(s) in order to capture video feed/image(s) of the scenario of the disaster site. The visual sensing solution(s) used on the present invention may be mounted on a retractable mount and may swivel or rotate 360° to provide comprehensive panoramic view of the disaster site, so as to be able to capture all-encompassing footage(s) of video feed/image(s) of the disaster site, which the visual sensing solution may send to the rescue team(s) via Wi-Fi technology.

In accordance with an aspect of the present invention, the present invention may incorporate a flashlight which may be used to aid in rescue mission(s) and/or to aid in survivor(s) extrication purposes. The flashlight may be appreciated as an added feature of the present invention, wherein the flashlight may be utilized to aid in rescue mission(s)/survivor evacuation purposes, especially rescue mission(s)/survivor evacuation(s) conducted in low visibility environments, dusty, foggy, hazy environments, and/or during night-time rescue mission(s)/survivor evacuation(s).

In accordance with an aspect of the present invention, the present invention may incorporate at least one Global Navigation Satellite Systems (GNSS) receiver(s) to acquire location information of the present invention within the disaster site, where GNSS signal may be obtained.

In accordance with an aspect of the present invention, the present invention may incorporate at least one positioning & navigation sensor such as Inertial Measurement Unit (IMU) for the purpose of measuring velocity, acceleration and/or orientation of the mobile robot/present invention within the disaster site/rescue site. The IMU sensor on the present invention may be used to provide location information of the present invention itself, especially more so, in situations where GNSS receiver of the present invention may not be able to acquire location information/co-ordinate information of the survivors or in cases where the GNSS solution may not be able to acquire location information of the present invention.

In an aspect of the present invention, since GNSS receiver(s) signals may not always be able to completely and accurately reach and/or track the location of survivor(s) trapped in/underneath the debris and/or behind walls due to RF propagation losses, building attenuation, brick attenuation and other such limiting factors, Bluetooth® Low Energy (BLE) technology (hereafter referred to as "Bluetooth LE technology or BLE technology in the disclosure) may be used in the present invention to supplement GNSS technology in order to track and locate the survivor(s) trapped underneath the debris/behind walls.

In accordance with an aspect of the present invention, the present invention may incorporate Bluetooth® Low Energy (Bluetooth® LE or BLE) technology/BLE solution to accurately track location of detected survivor(s) and also to communicate the location information of detected trapped survivor(s) to the rescue team(s). Bluetooth 5.1 Angle-of-Arrival (AoA) and/or Bluetooth 5.1 Angle-of-Departure (AoD) techniques may be used by the rescue team(s) to assess the most accurate location of survivor(s) based on information communicated with the BLE solution of the present invention. BLE may be considered to be a viable option for the present invention considering that BLE is less power-consuming compared to alternative wireless connectivity solutions such as GNSS.

In accordance with an aspect of method of use of the present invention, upon detection of trapped survivor(s) by the present invention's high-frequency radar sensor(s), the range and direction (angle) data of the trapped survivor(s) relative to the present invention which may have been assessed by the millimeter wave radar sensor and/or which may have been assessed by the IR-UWB radar sensor, may be transmitted to the MCU of the present invention for data analysis and processing. The invention's IMU instantaneous data as well as the invention's camera feed data at the instant of survivor(s)' detection, along with the instantaneous GNSS co-ordinates of the present invention (if acquired), may also be sent to the MCU of the present invention, for survivor(s)' location data analysis and processing.

The ranging and angle assessment feature of millimeter-wave radar sensor(s) and/or UWB radar sensor(s) housed on the present invention may be appreciated to be a capability that may be well exploited to track the location of trapped survivor(s) in conjunction with complementary location-tracking wireless connectivity technologies such as GNSS (where GNSS signals may be reachable), Bluetooth® LE (Bluetooth® Low Energy) & location information provided by camera and location information provided by IMU.

In accordance with an aspect of method of use of the present invention, the detected survivor location data collected from the sensors; namely from the live presence detection radar sensors, navigation sensors (IMU), visual sensing solution(s) and GNSS solution (in case location of present invention may be acquired by the GNSS solution); may be intelligently fused in the present invention using sensor data fusion algorithm(s), so to collate location information of the trapped survivor(s) and to be able to arrive at intelligible location information of detected trapped survivor(s).

In accordance with an aspect of method of use of the present invention, the processed and/or fused sensor data indicating location of detected survivor(s) may be sent from MCU to BLE module of the present invention for further data analysis and processing.

In accordance with an aspect of method of use of the present invention, the survivor(s)' location information may be then transmitted by the BLE antenna of the BLE module of the present invention to BLE-enabled rescue devices of rescue team(s).

In accordance with an aspect of method of use of the present invention, the rescue team(s) may be recommended to use BLE-enabled rescue device(s), for the purpose of communicating with the BLE solution on the present invention and receiving survivor location information from the BLE solution on the present invention. For the rescue mission, it may be recommended that a plurality of BLE-enabled rescue devices be used at the rescue site for survivor location assessment, wherein at least one of the BLE-enabled rescue devices may be stationed/positioned at a known fixed location/position along the boundary/periphery of the rescue site (or disaster site alternately).

In accordance with an aspect of method of use of the present invention, Angle-of-Arrival (AoA) technique may be used by the BLE-enabled devices (transmitter devices referred to as BLE "locators" in case of AoA) of the rescue team(s) for estimation of survivor location, based on the survivor location information transmitted by the BLE solution on the present invention to the BLE locator devices of the rescue team(s). A plurality of BLE-enabled rescue devices may be used for AoA calculation; wherein each BLE-enabled rescue locator device may house an RF switch and an antenna array, such that the spacing between successive antenna elements of a BLE-enabled rescue locator device's antenna array may not exceed more than half the BLE wavelength.

It may be recommended that the rescue team(s) may use triangulation in conjunction with Angle-of-Arrival calculation(s) for enhanced accuracy of survivor location estimation. It may be recommended that at least one BLE-enabled rescue locator device may have additional computational complexity (compared to the remaining BLE-enabled rescue locator devices used by the rescue team(s)) for estimation of most accurate survivor location from AoA calculations plus for resolving survivor direction from triangulating the angles-of-arrival collected from all the BLE-enabled rescue locator devices.

In accordance with another aspect of method of use of the present invention, Angle-of-Departure (AoD) technique may be considered as an alternative case of location assessment of present invention, wherein the BLE-enabled rescue devices may now, functioning as transmitters, send direction-finding signals to the BLE solution on the present invention for survivor location assessment.

In an aspect of method of use of the present invention, the mobile robot of the present invention may be programmed to move in the direction of the next strongest survivor vital sign detection. The mobile robot of the present invention may be stopped, based on algorithm/programming of the present invention and/or by command from the rescue team(s), once all survivors within the disaster area may have been detected/rescued, thereby ensuing needful action by the rescue team(s).

BRIEF DESCRIPTION OF THE DRAWINGS

The objectives as described above as well as the uniqueness of the proposed technology along with its advantages are better appreciated by referring to the following illustrative and non-limiting detailed description of the present invention along with the following schematic diagrams. Other objects and advantages of the present invention will become apparent to those skilled in the art upon reading the following detailed description of the preferred embodiments, in conjunction with the accompanying drawings, wherein like reference numerals have been used to designate like elements, and wherein:

FIG. 2 shows different views of an embodiment of the present invention;

FIG. 3 shows various possible mobile robot chassis/body shapes in perspective view;

FIG. 3A shows mobile robot chassis/body of an embodiment of the present invention in cuboid shape;

FIG. 3B shows mobile robot chassis/body of an embodiment of the present invention in elliptical (elongated) shape;

FIG. 3C shows mobile robot chassis/body of an embodiment of the present invention in hexagonal shape;

FIG. 4 shows examples of different possible combinations of limb shapes of the present invention from front view;

FIG. 4A-FIG. 4F shows front view of examples of possible limb-pair shape (i) and limb-pair shape (ii) arising from possibility of a shape of a pair of limbs of the present invention;

DETAILED DESCRIPTION OF THE INVENTION

Figure 1:
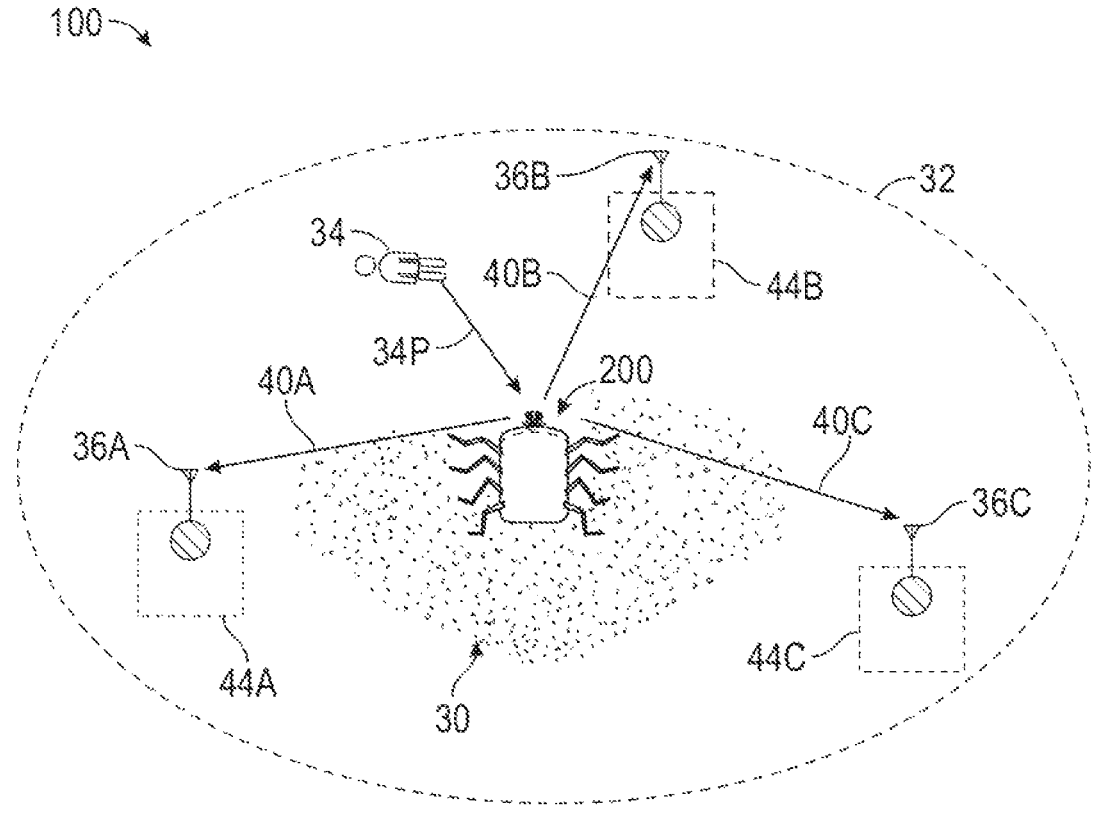
FIG. 1 illustrates an example of a disaster scenario where the present invention is being used for detection and location-finding of a trapped survivor lying underneath rubble at a rescue mission at a disaster site.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced items.

The disclosure of the present invention (200) described herein comprehensively describes the construction and currently known best method of use of an autonomous mobile robot (200), which may be intended to be used for the purpose of detecting and locating survivor(s) (34) trapped beneath debris (30) and/or trapped under building collapse(s) (30) and/or trapped behind (collapsed) walls (30) and/or trapped under landslide debris/avalanches (30) during search-and-rescue operation(s).

The term "detection device(s)" or "detection technology" or "detection system(s)" or "sensing device(s)" or "sensing system(s)" or "sensing technologies" used in the disclosure may imply to or refer to the use of high-frequency radar sensor(s), including but not limited to: microwave radar technology-based sensor(s) (10) and/or millimeter-wave radar sensor (10) and/or IR-UWB radar sensor (12) and/or combination(s) of feasible detection technologies such as visual information-capturing sensor(s) (such as visual imaging sensors) (20) that may currently be used in the present invention (200) and which may be included in future implementations of the present invention (200) in order to aid in disaster relief & rescue operation(s).

It may be noted that there may exist(s) possibility/possibilities that future implementation of the present invention (200) may incorporate sensor(s) and/or other such related module(s) which may amalgamate different functionalities onto the same hardware solution. Examples of possible future implementation(s) of hardware solution(s) amalgamating hybrid functionalities onto/within the same module used on/in the present invention (200) may include but may not be limited to: a) a mmWave radar sensor module (10)

which may incorporate BLE (4) functionality and/or b) a UWB sensor (12) which may incorporate BLE (4) functionality and/or c) GNSS module (8) incorporating IMU sensor(s) (6) and/or d) camera (20) incorporating IMU (6) functionality on the same hardware module, etc. Given that such combination(s) of different/hybrid component(s) (components mentioned in the disclosure of the present invention (200)) may be incorporated onto a hardware solution on/within the same footprint of the module, it may be noted that the fundamental essence of the present invention (200) may not be radically different, as long as the functionality of the component/module remains fulfilled towards the goal of survivor(s)' (34) detection and/or assessment of survivor(s)' (34) location.

Reference to the word "camera (20)/camera (20) sensor" in the disclosure pertaining to its (20) reference used in accordance with the present invention (200) refers to "visual sensing" such as thermal Imaging camera (20)/Electro-Optical InfraRed camera (20)/InfraRed camera (20)/thermal vision camera (20)/Night Vision camera (20)/stereo camera (20).

Reference to the term "solution" while referring to a hardware/component used in the disclosure of the present invention (200) may imply/refer to the use of a tangible component/part used on/in the present invention (200) and/or may refer to a System-on-Chip (SoC) or Integrated Circuit (IC) or chip or module (with built-in antenna(s)) or System-on-Module (SoM) with intelligence and/or signal processing capabilities. For example, reference to the term "BLE solution (4)" used in reference to the present invention (200) may imply the use of BLE SoC (4)/BLE chip (4)/BLE module (4) with intelligence and/or signal processing capabilities. Any additional circuitry (such as external antenna, voltage regulator, DC-DC convertor, voltage divider circuit(s), logic level shifter circuit(s), etc.) which may be required for powering/interfacing of the millimeter-wave radar sensor (10) solution, UWB solution (12), GNSS solution (8), IMU (6), camera (20), flashlight (16), and the BLE solution (4), may be decided upon by the choice of hardware solution used (SoC/IC/chip/module) in the present invention (200) and/or on the discretion of the product (200) manufacturer.

Reference to the term "disaster site (30)" within the disclosure may imply the area where devastation may be paramount. The use of "rescue site (32)" within the disclosure may imply the area where first responders and rescue team(s) may be allowed to begin and carry out rescue operations. The need and/or use of distinction between "disaster site (30)" and "rescue site (32)" in the disclosure may be due to physical limitations and/or geographical limitations being sometimes placed in the area of devastation, wherein sometimes the disaster area might be barricaded for rescue operations and allowed only for first responders and rescue personnel. In cases where there may be no barricades or limitations placed in the disaster area, "disaster site (30)" and "rescue site (32)" may be used interchangeably and may be construed to refer to the same area of devastation.

The idea behind the fundamental design of the present invention (200) may have been inspired majorly by the body design of arthropods such as insects, arachnids, crustaceans, myriapods, etc. The present invention (200) may aim to mimic specifically the likes of body design of certain arthropods such as insects and/or arachnids and thereby aim to mimic the ability provided by the body design of arthropods and other such lithe biological species to be able to navigate through crevices, nooks, corners, possible jagged terrain as well as rough terrain and/or bumpy terrain, which may pose a challenge for other biological species to navigate with equally similar ease. The objective behind the bio-inspired structural design and intended operation of the present invention (200) may have been conceived with a proposition to emulate the movement of (segmented) arthro-pods by designing a ruggedized autonomous ground vehicle (200) such as an autonomous mobile robot (200), shaped in the form of an arthropod with jointed (14b) appendages on its chassis (2), thereby rendering the mobile robot (200) (autonomous ground vehicle (200)) capable of locomotion and capable of moving in and around rugged terrain, uneven terrain, and/or potentially hazardous environments.

To this effect, the present invention (200) may aim to be designed as an autonomous ground vehicle (200)/mobile robot (200) incorporating high-frequency radar sensing/detection solution(s) such as Frequency Modulated Continuous Wave (FMCW) millimeter-wave radar sensor (10), Impulse Radio Ultra Wide-Band (IR-UWB) radar sensor (12) in conjunction with connectivity solutions such as Global Navigation Satellite Systems (GNSS) (8) and Blu-etooth® Low Energy (BLE) (4) technology onto an autonomous ground vehicle (AGV) (200)/mobile robot (200) for the purpose of detecting and locating survivor(s) (34) trapped beneath earthquake/building collapse/landslide debris/avalanches (30)/(32) for search-and-rescue opera-tions. The present invention (200) constituted by the mobile robot (2)/AGV (2) may additionally be equipped with on-board 360° rotating thermal imaging/InfraRed stereo camera (20) mounted on a vertical retractable pedestal (such as a pan-tilt unit) (20a) affixed to the mobile robot (2) for capturing video footage of the disaster scene to be sent via Wi-Fi to the rescue teams. The present invention (200) may also house a flashlight (16) for illuminating the disaster scene and/or for facilitating excavation of survivor(s) (34) by the rescue teams (especially during rescue missions conducted in low-lighting conditions such as in the night and/or rescue missions conducted in foggy, hazy environ-ments). The present invention (200) may incorporate a MEMS (Micro-Electro Mechanical Systems) Inertial Mea-surement Unit (IMU) (6) with a minimum of 6 DoF (De-grees of Freedom) or 6-axis IMU (6) to aid in the purpose of mobile robot's (200) localization and/or self-orientation within the disaster site (30)/(32).

FIG. 1 shows an illustration of an example scenario (100) of a search-and-rescue operation (following a disastrous event which may have led to building collapse(s)) being carried out at a disaster site (30). The present invention (200) may be shown to be detecting (34P) and locating survivor(s) (34) lying under/near the devastation (30)/debris (30) by receiving live presence signal (34P) from the trapped sur-vivor (34) lying underneath debris (30). The rescue team may be shown as using three devices (44A, 44B, 44C) at the boundary (32)/periphery of the rescue site (32). The present invention (200) may be shown to be communicating the information of survivor(s) (34) to the rescue team's rescue devices (44A, 44B, 44C) via signals (40A, 40B, 40C) respectively. In FIG. 1, rescue device (44A) may be shown to house antenna (36A), which may further be shown to be receiving detected survivor's (34) location information from the present invention (200) via signal (40A). Similarly, rescue device (44B) may be shown to house antenna (36B) which may further be shown to be receiving detected survivor's (34) location information from the present inven-tion (200) via signal (40B). Similarly, rescue device (44C) may be shown to house antenna (36C) which may be shown to be receiving survivor(s) (34) location information from the present invention (200) via signal (40C).

Figure 2A:
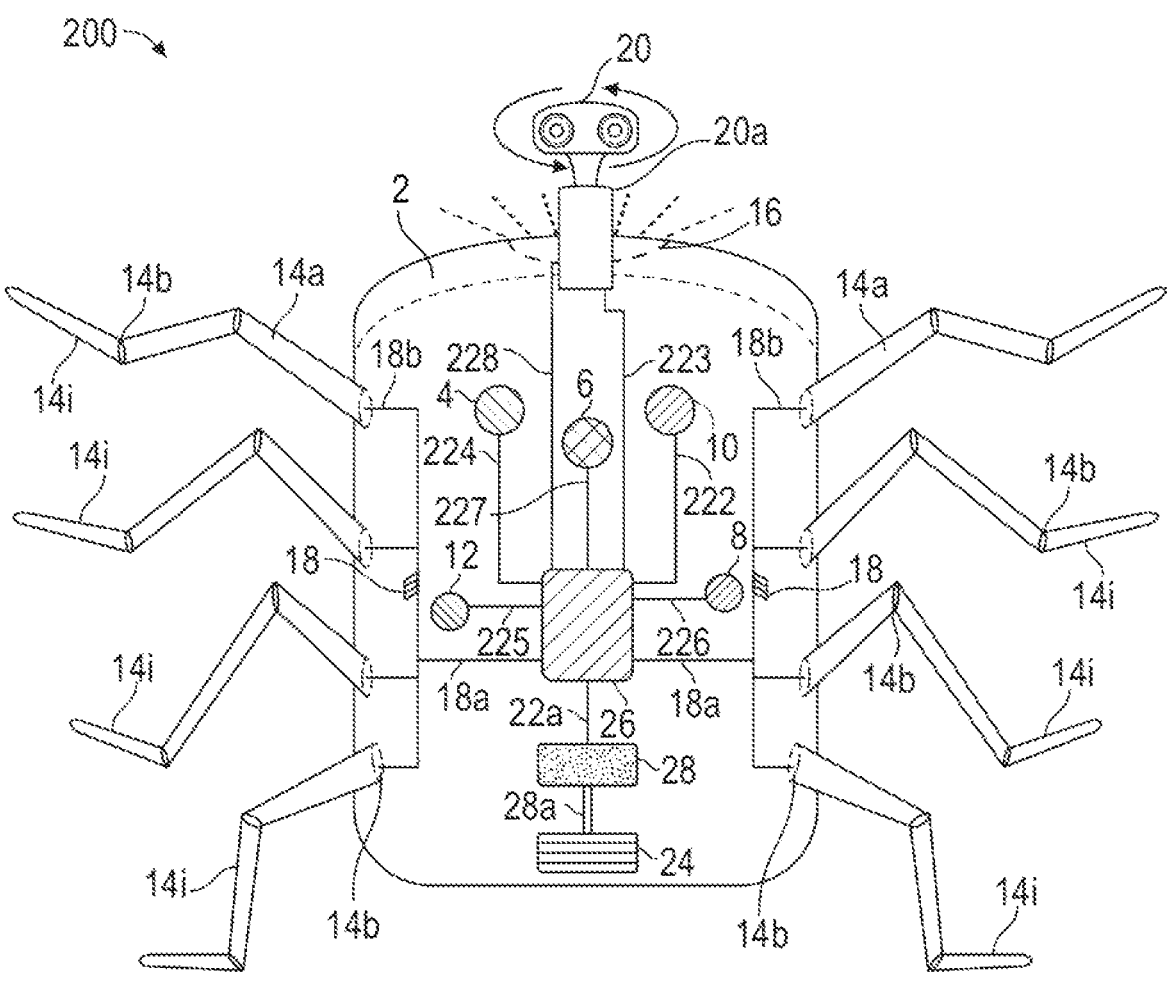
FIG. 2A shows an enlarged visualization of an embodiment of the present invention from top view with its principal constituent components.
Figure 5:
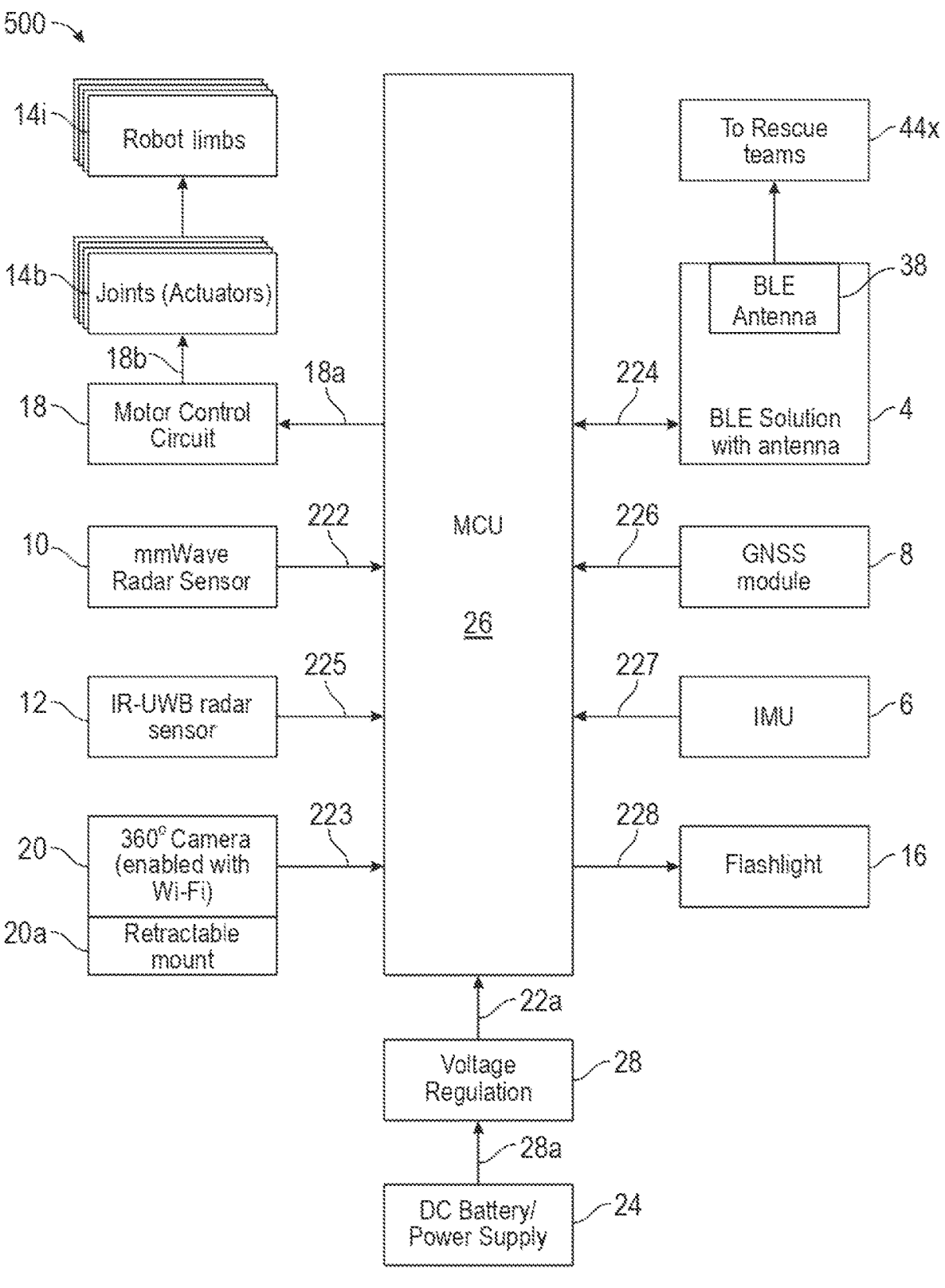
FIG. 5 shows a block diagram of the present invention with its principal constituent components.

The top view of an embodiment of the present invention (200) is shown in FIG. 2A. FIG. 5 shows the block diagram of the present invention (200) with its principal constituent components. The present invention (200) may be designed using components including, but not limited to: a movable/mobile robot body (2)/chassis (2) inside which/on which other principal constituent components such as circuit(s), sensors, peripheral(s), powering solution(s), actuator(s), etc. may be housed. Mention of the word "chassis (2)" in the context of the present invention (200) may not specifically intend to denote/include the presence of limbs (14i) together with the mobile robot chassis (2)/mobile robot body (2). Rather, the limbs (14i) of the present invention (200) may be fixed, screwed, attached and/or jointed to the robot body (2)/robot chassis (2) of the present invention (200).

As illustrated in FIG. 2A and as shown in the block diagram (500) of the present invention (200) in FIG. 5, the present invention (200) may be powered using a recharge-able internal Direct Current (DC) battery power supply (24) for its (200) operation. The mobile robotic device (200) need not be constantly connected to Alternating Current (AC) power source for its (200) operation.

The main body of the present invention (200) is/com-prises a mobile robot. In the embodiment of the present invention (200) shown in FIG. 2A, the mobile robot (2) has been shown to be shaped in the form of an arachnid (spider) with 4 legs (14i) on each lateral side of the rectangular chassis (2)/body (2) of the mobile robot (2)/present inven-tion (200), thereby totaling the limbs (14i) of the mobile robot (2) of the embodiment of the present invention (200) in FIG. 2A to 8 legs (i.e., 'i'=8).

Figure 2B:
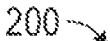
FIG. 2B shows the embodiment of the present invention from front view.
Figure 2B:
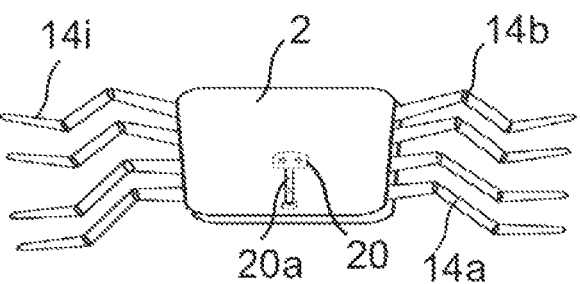
Figure 2C:
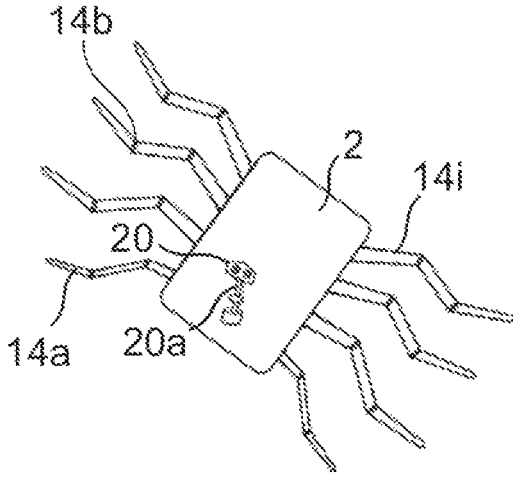
FIG. 2C shows the embodiment of the present invention in perspective view.
Figure 2D:
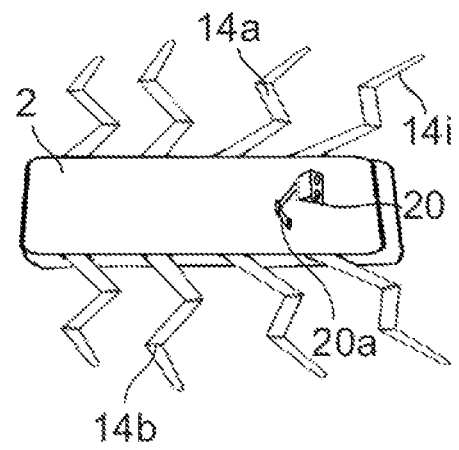
FIG. 2D shows the side view of the embodiment of the present invention from one lateral side.

The embodiment of the present invention (200) as shown in FIG. 2A has been depicted through different views as shown in FIG. 2B, FIG. 2C and FIG. 2D. FIG. 2B shows the embodiment of the present invention (200) from front view; FIG. 2C shows the embodiment of the present invention (200) from perspective view and FIG. 2D shows the embodi-ment of the present invention (200) from one lateral face (i.e., from one side) view.

The robot body (2)/robot chassis (2) of the present inven-tion (200) may be designed in any convenient form-factor—for example the mobile robot (200) may be designed with the robot chassis (2) in the shape of a cube, rectangular (cuboid), cylindrical, elliptical, circular, hexagonal shape, elongated shape or in a shape as may be convenient to the product (200) designer/product (200) manufacturer. The mobile robot body (2)/robot chassis (2) of the present invention (200) may be designed using Computer Aided Design (CAD) tool(s) for illustrative ease and/or for ease of visualization. Any other method/technique of designing the robot chassis (2)/mobile robot body (2), which may be convenient to the product (200) designer/product (200) manufacturer, may also be encouraged. The mobile robot chassis (2)/mobile robot body (2) so designed may then be prototyped into a tangible robot chassis (2)/tangible robot body (2) by using 3-D printing tool(s) (as an example technique; this may not be construed to be the only tech-nique or a limiting technique to materialize a robot into tangible form). The mobile robot body (2)/mobile robot chassis (2) of the present invention (200) may be designed and/or prototyped using alternative methods/techniques as may be considered convenient to the product (200) designer/product (200) manufacturer.

The footprint of the present invention (200) as shown in the embodiment of the present invention (200) in FIG. 2A may be along the dimensions of few centimeters (cm) in length (or longitudinal axis)×few cm in breadth (or lateral axis)×few cm in height (or elevation of the mobile robot (2) from the ground). Example: the footprint of the present invention could be between (12 cm length×12 cm width×6 cm height) and (22 cm length×22 cm width×16 cm height). The mobile robotic device (200) may be designed with such materials that it (200) weighs only a few grams. Since the present invention (200) may be designed to be light in weight, it may be recommended that the present invention (200) may be designed so as to weigh as an example between 5 kg-30 kg (so as to also be able to bear the weight of chassis (2) of the mobile robot and/or the weight of the components on/in the present invention (200)).

The present invention (200) may be designed with the robot chassis (2) in different shapes (300) as has been illustrated in FIG. 3. FIG. 3A shows the shape of a robot chassis (2) of an embodiment of the present invention (200) in a cube/rectangular/cuboid shape; FIG. 3B shows the shape of a robot chassis (2) of an embodiment of the present invention (200) in a cylindrical/elliptical shape; FIG. 3C shows hexagonal shape of a robot chassis (2) of an embodiment of the present invention (200).

Similar to the body design of segmented arthropods, the mobile robotic device (2) of the present invention (200) may be designed with pivoted (14b) and/or jointed (14b) legs (14i) which may be attached/affixed to each lateral/longitudinal face i.e., each longer/shorter side of the robot body (2) of the present invention (200) as shown in FIG. 2A, thereby facilitating the locomotion capability of the robot (2) of the present invention (200) and rendering the present invention (200) capable of movement.

It may be recommended that to render mobility to the present invention (200), the mobile robotic device (2) of the present invention (200)(as shown in the embodiment of the present invention (200) in FIG. 2A) may be designed with an even number of limbs (14i), wherein the limbs (14i) of the mobile robot (2) may be mounted symmetrically on either side of the robot chassis (2). The embodiment of the present invention (200) as shown in FIG. 2A may have been shown to be designed with a total of 8 legs (14i) on the robot chassis (2), with 4 legs (14i) on each lateral face (i.e., 4 legs (14i) on each longer side) of the rectangular robot body (2) of the present invention (200), thereby attempting to mimic the legs (14i) of an arthropod i.e., i=8 and 1<i≤8 in the embodiment of the present invention (200) shown in FIG. 2A.

Each leg (or limb) (14i) of the present invention (200) may be designed as comprising of at least two leg segments (14a). Each limb (14i) of the mobile robot (2) may have at least 4 degrees of freedom and the limbs (14i) of the present invention (200) may be designed to be hinged or attached on either side of the robot chassis (2), such that each limb (14i) of the present invention (200) may be identical in size and shape, so as to ensure reliable & synchronized limb (14i) movement. In the embodiment of the present invention (200) shown in FIG. 2A, each leg (14i) of the mobile robot (2) may be shown to be comprising of 3 leg segments (14a).

Leg segments (14a) of each leg (14i) of the present invention (200) may be connected to each other by at least one joint (14b). Each limb (14i) of the mobile robot (2) in the embodiment of the present invention (200) as shown in FIG. 2A may be shown to have three joints (14b) and three leg segments (14a). Two segments (14a) of leg (14i) of the present invention (200) may be shown to be connected by joints (14b) while one segment (14a) of the same leg (14i) may be shown to be connected to the main robot chassis (2) of the present invention (200). The leg segments (14a) of each leg (14i) can pivot individually, driven by the actuators (14b), depending on the MCU's (26) command to the mobile robot (200) and/or how the autonomous mobile robot's (200) motion may have been coded/programmed in the MCU (26) of the present invention (200).

Figures 4C, 4D, 4E, 4F:
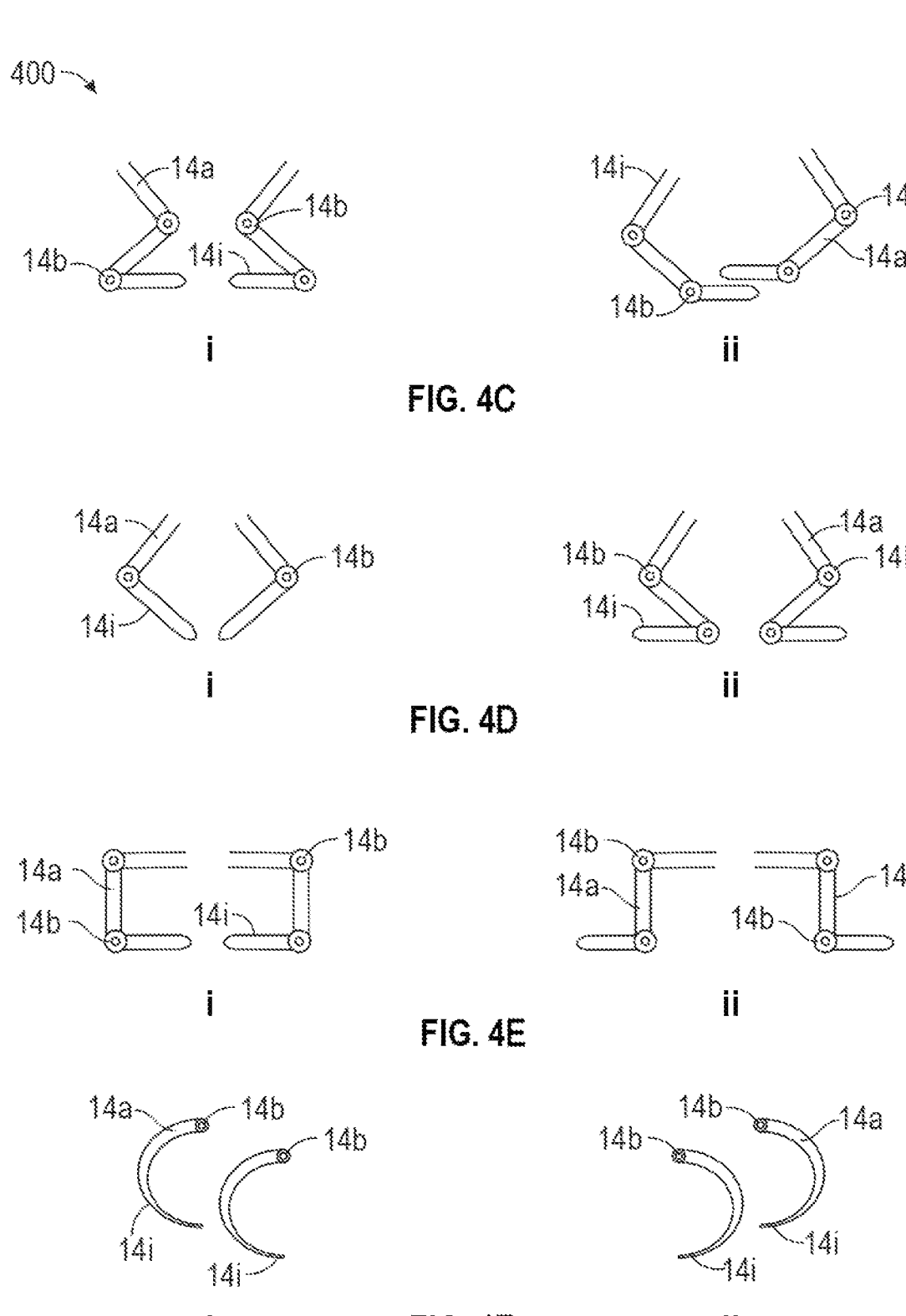

Different shapes of limbs (14i) have been shown in FIG. 4 as examples of the shapes in which the present invention's (200) limbs (14i) may be attached to the robot chassis (2)/body (2) of the present invention (200). Various possible combinations (400) of shapes of limb (14i) pairs have been portrayed in FIG. 4A (i) and (ii), in FIG. 4B (i) and (ii), in FIG. 4C (i) and (ii), in FIG. 4D (i) and (ii), in FIG. 4E (i) and (ii), and in FIG. 4F (i) and (ii). The limb (14i) pairs shown in FIG. 4 from FIG. 4A through FIG. 4F may be considered as having been depicted to show only some examples of the present invention's (200) limb (14i) pairs and may not be construed to be limiting on the shapes of robot (2) limb (14i) pair shapes that may be possible in an embodiment of the present invention (200).

It may be appreciated that alternative embodiments of the present invention (200) may be designed from combinations arising out of using varied chassis (2) shapes (as have been shown by some examples in FIG. 3) and limb (14i)-pair shapes (as have been shown by some examples in FIG. 4). For example, one alternative embodiment of the present invention (200) could be implemented with mobile robot chassis (2) of FIG. 3C with legs (14i) as shown in FIG. 4C (ii). Another example of an alternative embodiment of the present invention (200) could be implemented with mobile robot chassis (2) as shown in FIG. 3B with limb (14i)-pair shape as shown in FIG. 4C (i). The examples of chassis (2) shapes (as shown in FIG. 3) and/or the examples of limb (14i) pair shapes (as shown in FIG. 4) may be considered to be for illustrative purposes, and may not be regarded as limiting on the combinations of or on the possible number of chassis (2) shapes and/or limb-pair (14i) shapes that may be combined in order to design alternative embodiments of the present invention (200).

The idea behind using pivoted/jointed (14b) segments (14a) in the bio-inspired mobile robot's (2) legs (14i) is so that the mobile robot (2) can use its programming and/or actuators (14b) to rotate any segment (14a) of any leg (14i) around its pivot/joints (14b), thereby rendering the present invention (200) easily maneuverable and/or to render the present invention (200) to navigate through corners, crevices, nooks, uneven/undulating terrain with as much flexibility and ease as can be possible, in an effort to mimic the flexibility and ease of movement of species with legs≥4, such as the legs found on segmented arthropods.

The present invention (200) may incorporate a microcontroller unit (MCU) (26) or microprocessor unit (MPU) (26)—which may be considered to be the main brain of the present invention (200) and/or the driver of the present invention (200). The MCU (26) (or MPU (26)) of the present invention (200) may be used to control the movement of the mobile robot (200) and/or the MCU (26) may be used to control the response and behavior of the mobile robot (2)/present invention (200) to external stimuli. The MCU (26) of the present invention (200) may be used to control the operation of the camera (20), IMU (6), flashlight (16). The MCU (26) of the present invention (200) may be used to process the data received from the mmWave radar sensor (10), UWB solution (12), IMU (6), GNSS (8), camera (20). The MCU (26) of the present invention (200) may be used to trigger GNSS solution (8) and BLE solution (4) for obtaining localization and/or information regarding the location of present invention (200)/trapped survivor(s) (34). The MCU (26) of the present invention (200) may be used to command and control the limbs (14i) of the mobile robot (2)

in such a way that the present invention (200) may be able to move towards live survivor(s)(34) and detect live survivors (34) trapped under earthquake/building collapse/landslide debris (30).

Since the components of the present invention (200) such as mmWave radar sensor (10), UWB sensor (12), GNSS solution (8), BLE solution (4), camera (20), IMU (6), flashlight (16), motor control circuit (18), MCU (26) and/or other circuits/electronic module(s) within the present invention (200) may be powered by different operating voltages, voltage regulating circuit(s) (28) such as voltage regulator(s) and/or DC-to-DC convertor circuits(s)(also referred to as DC-DC convertor(s) or DC/DC convertor(s)) and/or Low Drop Out Regulator (LDO) circuit(s) (as may be considered applicable by the system designer) may be used to regulate the power/voltage supplied to the electronic component(s)/ electronic circuit(s) within the present invention (200). For example, the MCU (26) voltage may be regulated (22a) by the voltage regulation circuit (28) as shown in FIG. 2A and as shown in the block diagram of FIG. 5. In case a/any component of the present invention (200) requiring specific current/voltage regulation does not have in-built power/ voltage regulation, it may be recommended that external voltage regulation may be used for the particular said component, in order to avoid damage to the component/ module and/or to avoid damage to the component/module/ device (200) from excessive voltage and/or to avoid damage to the component/module/device (200) from overheating and/or to avoid damage to the component/module/device (200) from electrical damage. This includes but is not limited to stepping down the DC battery (24) voltage from +9V (or +12V) to voltage range(s) acceptable for digital logic/peripheral operation and/or between circuit/compo-nent operating voltages such as +1.7V, +3.3V, +3.5V to +5.5V (or any other operating voltage specified by the respective manufacturer of the MCU (26)/electronic circuit/ peripheral) in order to drive the MCU (26) and/or other electronic circuit(s) and/or peripherals within the present invention (200). As shown in FIG. 2A and as has been depicted in the block diagram in FIG. 5, the power/voltage from the DC battery power supply (24) may be regulated (28a) by the voltage regulation circuit (28). The component/ voltage regulation circuit indicated by (28) in FIG. 2A and as shown by (28) in the block diagram of FIG. 5 does not necessarily imply that all the circuit(s), actuators (14b), motor control circuit (18), the MCU (26), sensor solution circuit(s) (6, 12, 10, 20), connectivity solution circuit(s)/ module(s) (4, 8) and/or (16) and/or any component of the present invention (200) are all powered by the exact same voltage. The voltage conversion/voltage regulation circuit(s) (28) shown in FIG. 2A and shown in the block diagram of FIG. 5 has been depicted to state that the MCU (26) and/or different sensor modules (10, 12, 6, 20) and/or connectivity modules (8, 4) and/or (16) and/or electronic circuit(s) (such as 18) may be powered by their own individual respective operating voltage as may be stated/recommended by the corresponding component manufacturer.

Since the MCU (26) of the present invention (200) may operate at a voltage different from the voltage that may be supplied by the DC battery supply (24) of the present invention (200), voltage regulating circuit(s)(28) may be connected (28a) to the battery (24) of the invention (200). The voltage regulation circuit(s) (28) may be used to regu-late the voltage/power fed (22a) into the MCU (26) of the present invention (200), so as to avoid overheating/electrical damage to the MCU (26) and/or to avoid damage to the present invention (200).

As shown in FIG. 2A and as shown in the block diagram in FIG. 5, a motor control circuit (18)/motor controller (18) may be used within the present invention (200) as an interfacing component in order to interface the power supply (battery) source (24) and/or MCU (26), to the motors (14b) of the robot (2), (via serial communication interface example UART or possibly even Pulse Width Modulation (PWM) technique), by which the motor control circuit (18) may assist in controlling the direction of movement/locomotion of the robot (200).

The motor control circuit (18)/motor controller (18) may be connected (18b) to the motors (14b) of the limbs (14i) of the mobile robot (2) as has been shown in FIG. 2A. The motor control circuit (18) may control each limb (14i) of the mobile robot (2) of the invention (200) through connections (18b), based on the MCU's (26) command to the motor control circuit (18) of the mobile robot (200) through (18a) and/or depending on how the autonomous mobile robot's (200) movement may have been programmed in the MCU (26) of the present invention (200). In FIG. 2A, the MCU (26) may have been shown to be connected to the motor control circuit through (18a)—this may be construed to mean that the MCU (26) may be sending commands/signals to the motor control circuit (18). In FIG. 2A, the motor control circuit (18) may be shown to be connected to the motors (14b)/actuators (14b) of each limb (14i). In FIG. 2A, it has been shown that way in order to be understood that the present invention (200) employs motor controller (18) to drive the actuators (14b)/motors (14b) and it may not necessarily mean that only one motor control circuit (18)/ only one motor controller (18) drives the limbs (14i) on one lateral side of the embodiment of the present invention (200) shown in FIG. 2A. The motor control circuit (18) may be chosen based on the type of motor(s) (14b)/actuators (14b) elected to drive the robot (200) limbs (14i).

For the purpose of detecting human(s) (34)/animal(s) (34) trapped under earthquake/building collapse/landslide debris (30)/behind walls (30), the present invention (200) may be housed with live presence detection radar sensor(s) (10, 12) on or inside the robot chassis (2)/body (2), depending on the option of designing the present invention (200) with dis-creetly integrated components to allow for enhanced aes-thetic appeal and/or visual appeal, if so desired by the product (200) manufacturer.

In FIG. 5 which shows a block diagram of the present invention (200) and as illustrated in FIG. 2A which shows an embodiment of the present invention (200) with its principal constituent components, the present invention (200), for the purpose of detecting human(s)(34)(or even animal(s) (34)) trapped under earthquake/building collapse/landslide/ava-lanche debris (30)/behind walls (30), may incorporate high-frequency radar sensor(s)(10, 12) operating on microwave frequency (operating in the frequency range of 300 MHz-30 GHz, example 24 GHz radar sensor (10)) and/or millimeter-wave frequency (operating in the frequency range of 30 GHz-300 GHz, example 60 GHz radar sensor (10) or 77 GHz-79 GHz radar sensor (10)) and Impulse Radio Ultra-WideBand (IR-UWB) radar sensor (12) (operating in the frequency range of 3.1 GHz-10.6 GHz with a bandwidth (BW) of 500 MHz-1.3 GHz). The microwave radar sensor(s) (10) and/or millimeter-wave radar sensor(s) (10) and IR-UWB radar sensor(s) (12) may be used in the present invention (200) as the detection/sensing mechanism, thereby facilitating detection of live presence (34)/live survivor(s) (34) trapped behind walls (30)/under debris (30), following seismic disaster(s)/building collapse(s)/landslide/avalanche related disaster(s).

The presence detection radar sensor(s) (10, 12) which may be elected to be used in the present invention (200) such as millimeter-wave radar sensors (10) and IR-UWB radar sensors (12) may have the ability to detect micro changes as well as macro changes in the vital signs of a human being such as: heartbeat (heart rate), respiration (respiratory rate), breathing (breathing rate); even if the survivor(s) (34) may be in a stationary position or even if the survivor(s) (34) may not be exhibiting any rapid movement. These subtle, yet highly sensitive and crucial parameters may be detected using high-frequency, high-precision millimeter wave radar sensors (10) and UWB radar sensors (12) with great resolution, due to their quality of micro-motion and macro-motion detection.

The underlying concept of radar sensors is that millimeter-wave radar sensor technology (10) and IR-UWB radar sensor technology (12) may be able to detect vital signs or changes thereof (vital signs such as respiration/respiration rate, heart rate, breathing rate, etc.) of survivor(s) (34) (i.e., live human being(s) (34)/live warm-blooded animal(s) (34)) from a distance without the need for physical contact with the survivor(s) (34). This capability of millimeter wave radar sensor (10) technology and/or IR-UWB radar sensor technology (12) to detect changes in vital signs of survivor(s) (34), especially in an unobtrusive & contactless manner, may be leveraged to detect the presence of survivor(s) (34) trapped near/on/under crevices, crannies, nooks, behind walls and/or any other such unreachable corners (30) in/around/under the debris (30)/behind walls (30), etc., by incorporating radar sensor(s) (10, 12) on the mobile robot (2) of the present invention (200). Millimeter-wave radar sensing technology as a detection sensor in the present invention (200) is also used to assess the distance, velocity and angle (or direction) of the target (34) (in this case, target refers to "survivor (34) detected to have been trapped under earthquake/building collapse/landslide/avalanche rubble (30)").

Millimeter wave radar sensor technology (10) and/or IR-UWB radar sensor technology (12) have the ability to detect micro as well as macro changes in the vital signs (or changes thereof) of a live human (34)/warm-blooded animal (34) and may thereby be able to detect stationary survivor(s) (34) and/or be able to detect even the slightest movement of survivor(s) (34), when they (34) may be trapped on/around/under debris (30) and/or if survivor(s) (34) may remain trapped behind walls (30). Detecting stationary survivor(s) (34) trapped around/on/under debris (30)/behind walls (30) may become crucial in cases where the survivor(s) (34) may be trapped lying unconscious, weak and/or motionless under the debris (30) and/or when the survivor(s) (34) may be trapped behind walls (30).

The millimeter wave radar sensor(s) (10) used in the present invention (200) may be FMCW (Frequency Modulated Continuous Wave) radar sensors. Alternatively, Doppler-based millimeter-wave radar sensors (10) may also be used for detection of moving survivor(s) (34) trapped under earthquake debris (30). Depending on the operating frequency of the mmWave radar sensor (10) and the underlying technology of the mmWave radar sensor (10) used in the present invention (200), i.e., whether the mmWave radar sensor (10) may be used in FMCW mode or Doppler-mode, millimeter-wave radar sensing (10) technology as a detection sensor (10) in the present invention (200) may additionally be used to assess the distance and/or velocity and/or angle (or direction) of the target (34) (in the case of this disclosure, "target" (34) refers to "survivor" (34) detected to have been trapped under debris (30)/behind walls (30)").

The survivor detection capabilities of the millimeter-wave radar sensor (10) may depend on the radar sensor's (10) Field-of-View (FoV). It is recommended that the FoV of the radar sensor (10) may be ±120° i.e., around ±60° azimuth and ±60° elevation in angle. MIMO antennas may enhance the Field-of-View (FoV) of the mmWave radar sensor (10).

As shown in FIG. 2A and as has been shown in (500) in the block diagram in FIG. 5, IR-UWB solution (12) may be used in the present invention (200) for the purpose of detection of survivor(s) (34), peer-to-peer ranging and estimation of survivor(s)' (34) location with respect to the present invention (200). The UWB solution (12) on the present invention (200) may also be used to calculate range and angle of detected survivor(s) (34) trapped under the rubble (30) and/or assess direction and range of survivor(s) (34) trapped behind walls (30). UWB positioning technology may be a relatively secure solution for survivor(s) (34) localization, providing centimeter-level accuracy, thereby validating and supporting its use within the present invention (200) for disaster-rescue.

The UWB solution (12) may operate in the frequency range of 3.1 GHz-10.6 GHz with a bandwidth (BWuwB) of 500 MHz 5 BWuwB≤almost approximately 1.3 GHz. The UWB solution (12) may be used to transmit pulses of duration 2 ns (nanosecond) to the target (34)/survivor(s) (34). The pulses may then be reflected off the human (34)/animal (34) and may be received by the UWB solution (12). IR-UWB radar sensor technology (12) may use the Time-of-Flight (ToF) method to assess the distance (range) of the survivor(s) (34), relative to the present invention (200). The time difference between the transmission time of the UWB pulse and the reception time of reflected pulse may be considered to be ToF. The distance (or range 'duwB') of trapped survivor(s)(34) from location of present invention (200) may be calculated from 'duwB'=[ToF×c]/2 where 'c'=speed of light=$3 \times 10^8$ m/s. The high bandwidth usage of IR-UWB radar sensor (12) may allow/facilitate the IR-UWB radar sensor (12) to be able to distinguish between closely spaced multiple individual survivor(s)(34), even while the survivor(s) (34) may sometimes be spaced as close as 30 cm apart from each other. The separation distance between closely situated survivor(s) (34) who may have been detected by the IR-UWB radar sensor (12) may depend upon the exact frequency of operation of the IR-UWB radar sensor solution (12) elected to be used in the present invention (200). The high frequency of operation (3.1 GHz-10.6 GHz) of the IR-UWB radar sensor (12) used in the present invention (200) may facilitate for greater penetration of the UWB pulses (even in non-Line of Sight (non-LOS) conditions), thereby allowing the IR-UWB radar sensor (12) to detect survivor(s) trapped behind walls (30).

The survivor detection capabilities of the IR-UWB radar sensor (12) may depend on the radar sensor's (12) Field-of-View (FoV). It is recommended that the FoV of the radar sensor (12) may be ±120°. MIMO antennas may enhance the Field-of-View (FoV) of the UWB radar sensor (12).

The millimeter-wave radar sensor (10) solution and/or the IR-UWB radar sensor solution (12) used in the present invention (200) may be radar sensor Integrated Circuit (IC) (10, 12) or may be a radar sensor System-On-Chip (SoC) (10, 12) or may be a radar sensor module (10, 12). Depending on the radar sensor solution (10, 12) considered in the present invention (200), the datasheets from the radar sensing solution (10, 12) manufacturer may provide idea on what components/electronic circuits may already be present within the radar sensor solution (10, 12) and accordingly the remaining required electronic circuits may be decided upon.

In case the sensors (10, 12) requiring analog-to-digital conversion and/or digital-to-analog conversion do not already have an ADC/DAC built in them, the product manufacturer of the present invention (200) may then upon his/her/their discretion use additional signal conditioning circuit(s) such as Analog-to-Digital Convertor (ADC) circuit(s) and/or Digital-to-Analog Convertor (DAC) circuit(s) or any other such required electronic circuitry as deemed required and/or applicable by the system designer/manufacturer of the present invention (200).

The detection range of the radar sensor(s) (10, 12) used on the present invention (200), i.e., the distance of detection from the survivor(s) (34) to the radar sensor(s) (10, 12) on the present invention (200) may vary depending upon the radar sensor(s)' (10, 12) operating frequency and/or the number of antennas used on the radar sensor(s) (10, 12) and/or the operating mode of the radar sensor(s) (10, 12).

As illustrated in FIG. 2A and as has been shown in FIG. 5, the present invention (200) may incorporate a GNSS solution (8) for the purpose of positioning and navigation sensing, tracking and obtaining location co-ordinates of trapped survivor(s)(34) and the location co-ordinates of the present invention (200), wherever possible, since GNSS signals may be denied at certain times and/or GNSS signals may be denied in certain locations such as in underground locations, inside tunnels, in canyons, and/or in challenging locations within the disaster site (30)/rescue site (32) where the survivor(s) may be trapped. The GNSS solution (8) may be interfaced (226) with the MCU (26) of the present invention (200) through GNSS product-compatible interface.

The present invention (200)/the mobile robot (2) may incorporate a 6-axes (6 DOF (Degrees of Freedom)) Inertial Measurement Unit (IMU) (6), as has been shown in FIG. 2A and as has been portrayed in the block diagram in FIG. 5. The use of MEMS (Micro-Electro Mechanical Systems) on IMU sensor (6) on the present invention (200) may make miniaturization of the IMU sensor (6) possible, so that the IMU (6) may be able to fit onto a smaller footprint. The IMU sensor (6) on the present invention (200) may comprise 3-axis accelerometer and 3-axis gyroscope for the purpose of localization and orientation of the present invention (200) with respect to a fixed (known) frame of reference. The frame of reference of the present invention (200) may be the origin co-ordinates (starting point) on the disaster-affected area (30) or rescue site (32) from where initial movement of the present invention (200) may be considered to start. The initial origin point/co-ordinates of the affected area (30, 32) may be ascertained by the rescue team based on factors including but not limited to—the geographical position co-ordinates in and/or around the affected disaster area (30)/rescue site area (32), the disaster area (30) (in square metric units such as square meters, square km, square foot), any existing landmark(s) in and/or around and/or near the disaster-affected area (30)/rescue site area (32) and orientation of the disaster-affected area (30)/rescue site area (32). The inertial sensor(s) (6) may update the velocity and orientation of the present invention (200) by integrating the data so received by the inertial sensors (6), so that the mobile robot (2)/the present invention (200) may be able to use the inertial sensor (6) data in sensing the present invention's (200) own acceleration and angular velocity, based on initial conditions of position co-ordinates.

The data from the IMU (6) may be fed (227) into the MCU (26) of the present invention (200) for processing and analysis of the inertial sensor (6) data and/or to determine the next path/course or direction of the present invention (200).

Since the rescue mission would greatly be at an added advantage if the scenario/terrain at the disaster-affected site (30)/rescue site (32) and/or objects within the disaster site (30)/rescue site (32) could be mapped onto video/images for visual clarity, the present invention (200) therefore aims to incorporate visual sensing solution(s) such as an Electro-Optical InfraRed (EO-IR) imaging camera (20)/thermal imaging camera (20)/stereo camera (20) sensor module on the mobile robot (2) of the present invention (200).

The present invention (200) may incorporate a 360° rotating camera (20) module which may be mounted on a retractable stand (20a)(akin to a 3-axis gyro-stabilized gimbal). The retractable stand (20a) further may be affixed on the mobile robot (2) of the present invention (200) as shown in FIG. 2A. The retractable vertical mast (or pan/tilt unit (PTU) or pedestal or vertical stand) (20a) affixed to the chassis (2) of the mobile robot (200) may be capable of retracting to short height as well as extending to greater height, in order to be able to survey the expanse of the disaster site (30)/rescue site (32) thoroughly and/or scout for survivor(s) (34). The retractable stand (mast)(20a) affixed to the mobile robot chassis (2)/mobile robot body (2) of the invention (200) may be around 10 cm (0.1 meters) measured at its shortest retracted height from the mobile robot chassis (2)/mobile robot body (2) to around 200 cm (2 meters) in height when completely erect, measured from the robot chassis (2)/robot body (2) of the present invention (200). When the mobile robot (present invention (200)) may move along the terrain of the disaster-affected site (30)/rescue site (32), navigating and scouting the area for live survivor(s) (34) trapped anywhere in the disaster-affected site (30)/rescue site (32), the camera (20) mounted (20a) on the mobile robot (2) may rotate 360° in order to span the entire landscape of the disaster-affected site (30, 32) to gain a comprehensive panoramic view of the disaster-affected area (30, 32) and may capture images/video footage of the objects within the disaster-affected site (30, 32), including the presence of life (34) in the disaster-affected area (30, 32). The visual data i.e., the image(s)/video footage of the objects within the disaster-affected site (30, 32) so captured by the camera (20) on the present invention (200) may be streamed to the rescue team's device(s) (44A, 44B, 44C) using Wi-Fi technology for providing visual information of the disaster scenario as well as to facilitate added (enhanced) location and positioning accuracy of the present invention (200).

The camera (20) sensor/module on the present invention (200) may be interfaced (223) to the MCU (26) of the present invention (200). The data collected (i.e., image/video footage from the disaster-affected site (30, 32)) by the camera (20) sensor/module of the present invention (200) may be sent (223) to the MCU (26) of the present invention (200). The data from the camera (20) sensor may be analyzed and processed further by the MCU (26) of the present invention (200) and the camera (20) visual data may be complemented with the data from the other sensors (10, 12, 8) in order to drive the mobile robot (2)/the present invention (200) in the direction of live presence (34)/survivor(s) (34). The visual data from the camera (20) sensor may also be used when augmented with the location/positioning data from the mmWave radar sensor (10), the UWB sensor (12), the GNSS solution (8)(whenever and wherever GNSS signal reception may be possible, depending on successful location co-ordinate acquisition of the survivor(s) (34) location) and the IMU (6), in order to ascertain the most accurate survivor(s) (34) location, so that the collated sensor data may be transmitted to the rescue team(s) using the BLE transmit antenna (38) on the present invention (200).

The present invention (200) may incorporate an LED (Light Emitting Diode) flashlight (16) housed onto the mobile robot (2) as has been shown in FIG. 2A and as has been depicted in the block diagram of (500) in FIG. 5. The flashlight (16) on the present invention (200) may consist of a multitude of at least 12-20 LEDs such that the flashlight (16) may have the capability of producing at least 1000 lumens with the LEDs combined. The flashlight (16) on the present invention may be used to aid in rescue operation and/or survivor(s) (34) evacuation operation by illuminating area(s) of the disaster-affected site (30) such as dark corners and/or deep recesses at the disaster site (30) and/or if necessary, illuminate even the rescue site (32). The flashlight (16) on the present invention (200) may be especially appreciated as an aid during rescue missions/survivor(s) (34) evacuation operation(s) conducted during night and/or during rescue missions/survivor(s) (34) evacuation operation(s) conducted in low-light conditions and/or during rescue missions/survivor(s) (34) evacuation operation(s) conducted with visibility challenges (this may be due in part to fog, dust and/or haze which may arise from the devastation/debris). The flashlight (16) may be interfaced (228) to the MCU (26) of the present invention (200), through SCPI/I2C interface or any other compatible manufacturer-specified interface. At the commencement of the rescue mission, the flashlight (16) may be switched on by the MCU (26) of the present invention (200) for as long as the survivor(s) may need to be rescued by the rescue mission team and/or for as long as may be deemed necessary by the rescue team(s).

As shown in FIG. 2A and as shown in the block diagram in FIG. 5, the present invention (200) may incorporate Bluetooth® Low Energy (Bluetooth LE or BLE) 5.1 technology (4) as location tracking and direction-finding technology. BLE technology may be used in conjunction with the added capabilities of mmWave radar sensor (10), UWB radar sensor (12), Global Navigation Satellite Systems (GNSS) (8), camera (20) module and IMU (6).

The present invention (200) may use a BLE 5.1 solution (4) as a location-tracking and direction-finding technology. The BLE solution (4) may also be used to communicate the survivor's (34) location data to the BLE devices (44A, 44B, 44C) of the rescue teams at the site of disaster (30)/rescue (32). The components present within the BLE solution (4) may be referred to from the BLE solution (4) manufacturer's datasheet(s). Based on the information procured and on the discretion of the manufacturer of the present invention (200), any remaining components as deemed requisite for functioning of the BLE solution (4) may then be added to the present invention (200).

The MCU (26) may be interfaced with the motor control circuit (18) through (18a), with the mmWave radar sensor (10) through (222), with the UWB solution (12) through (225), with the GNSS solution (8) through (226), with the flashlight (16) through (228), with the camera (20) through (223), with the IMU (6) through (227), with the BLE solution (4) through (224); by using the respective components' compatible interfacing options such as Inter-Integrated Circuit (I²C)/Serial Peripheral Interface (SPI)/Universal Asynchronous Receiver-Transmitter (UART) or any other such industry-standard compatible serial communication interfaces. The interfacing options while designing the present invention (200) may be based on the knowledge and discretion of the product (200)/device (200) manufacturer.

Other electronic component(s)/circuit(s) including, but not limited to: resistor(s), capacitor(s), Schottky diode(s), voltage regulating circuit(s) (28) (such as DC-DC convertor circuit(s) and/or LDO circuit(s)), etc. may be used as applicable for proper regulation of current/voltage flow in the present invention (200) and for correct operation of the present invention (200). The number of electronic component(s) and their value(s) may be chosen and/or the circuit(s) may be designed on the basis of the discretion of the product (200) designer/product (200) manufacturer to ensure correct intended device (200) operation as well as adequate thermal/power, mechanical, and electrical protection of the present invention (200). It may be recommended that the components (4, 6, 8, 10, 12, 20, 26) and/or other circuit(s) of the present invention (200) may have operating temperature range of −40° C. to at least +85° C.

The behavior of the autonomous robotic device (200)/present invention (200) may be controlled by an internally housed [re]programmable Microcontroller Unit (MCU (26)/MPU (26)). The functions of the mobile robot (200) may be controlled via algorithm/software/firmware loaded within the MCU (26). The algorithm/software of the MCU (26) may be programmed using programming language(s) including but not limited to: Robot Operating System (ROS) and/or general C programming and/or Embedded C programming and/or C++ and/or Python and/or OpenCV and/or MatLab and/or Arduino Integrated Development Environment (IDE) and/or other such software for programming robots.

The degree of autonomy of the robot (200) may depend on the sophistication/complexity of the algorithm/program coded into the present invention's (200) microcontroller (MCU (26)). For the present invention (200), it is recommended that the mobile robot (200) have a minimum of 4 levels of autonomy for optimal operation of the present invention (200) as intended.

Since the communication from present invention (200) may be intended to transfer survivor(s)' comprehensive collated location data from the BLE solution (4) on the present invention (200) to the rescue team(s), the rescue team's device requires BLE-compatible device(s) in order to receive location information of the trapped survivor(s).

Since application(s) of the present invention (200) focus on the detection and position-estimation of live (34) presence (using the combined technological capabilities of sensors such as mmWave radar sensor (10), UWB radar sensor (12), camera (20) sensor, inertial sensor(s) (6) and GNSS solution (8) (if location co-ordinate data of the present invention (200) is/are acquired by the GNSS solution (8))) to be able to deduce/see the existence of survivor(s) (34) and thereby decide its (200) next path, the algorithm on the MCU (26) of the present invention (200) may be so coded such that the present invention (200) may travel in the direction where the next survivor (34) may be present. The algorithm of/in the present invention (200) may be coded/programming of the present invention (200) may be done, based on data combined from the mmWave radar sensor (10), UWB radar sensor (12), camera (20) sensor, the IMU (6) sensor and GNSS sensor (8) data (if present invention's (200) location co-ordinate data may be so acquired).

The present invention (200) may be designed by mounting/placing the circuit(s) and/or component(s) on/around the mobile robot chassis (2) in the most optimal manner, keeping in mind mechanical, space, thermal and power considerations and/or limitations of the present invention (200)

and/or based on the limits permissible by prevailing laws of the land, where the present invention (200) may be intended to be designed or used.

Proposed Method of Use (600) of the Present Invention (200)/Principle of Operation (600) of the Present Invention (200):

The principle of operation (600)/method of use (600) of the present invention (200) with regards to the process of robotic device (200) navigation, detection of trapped survivor(s) (34), location tracking of survivor(s) (34) and survivor(s) (34) location communication, has been proposed and outlined in as much detail as possible in the current section of the disclosure. The current method of use/principle of operation (600) of the present invention (200) proposed herein may not be construed to be the only method and/or sole method of use of the present invention (200), but may be appreciated to be one of the currently best known method(s)/optimum method of use of the present invention (200) in accordance with the existing local law(s) and/or regulation(s) and/or environmental condition(s) and/or any other such factor(s) that t, may be conducive to satisfactory intended operation of the present invention (200). The principle of operation/method of use (600) of the present invention (200) has been portrayed in the form of a flowchart describing the main processes (steps) involved in using the present invention (200) for survivor(s)' (34) detection and location-tracking in FIG. 6.

In the event of a disaster such as an earthquake and/or building-infrastructure collapse and/or landslide and/or avalanche and/or floods and/or any man-made error(s)/man-made disaster(s), the present invention (200) due to its relatively easy portability feature may be carried/transported to the rescue site (32)/disaster site (30) to assist in search & rescue operation(s).

Figure 6:
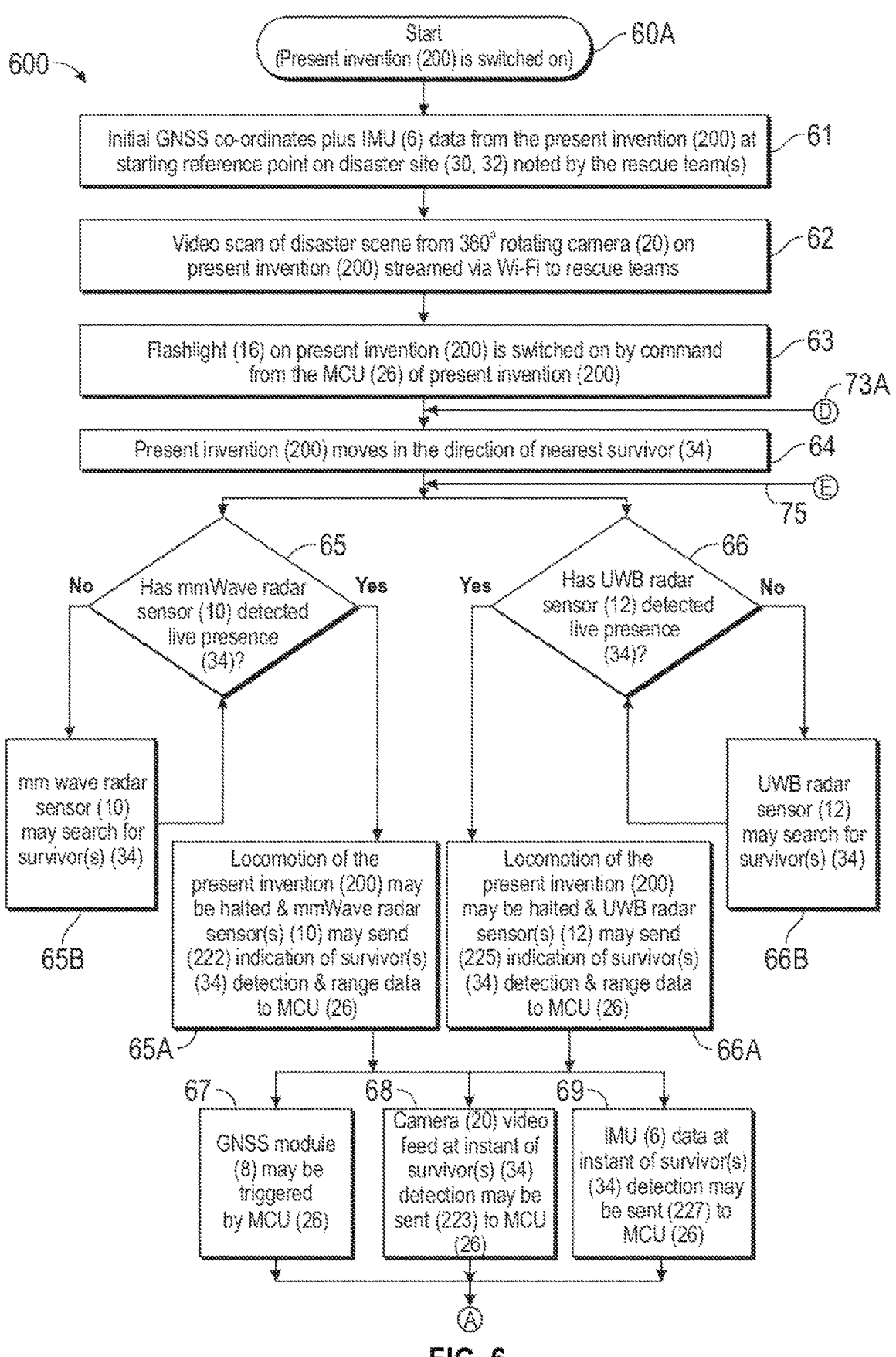
FIG. 6 shows a flowchart describing the currently known best method of use of the present invention.
Figure 6:
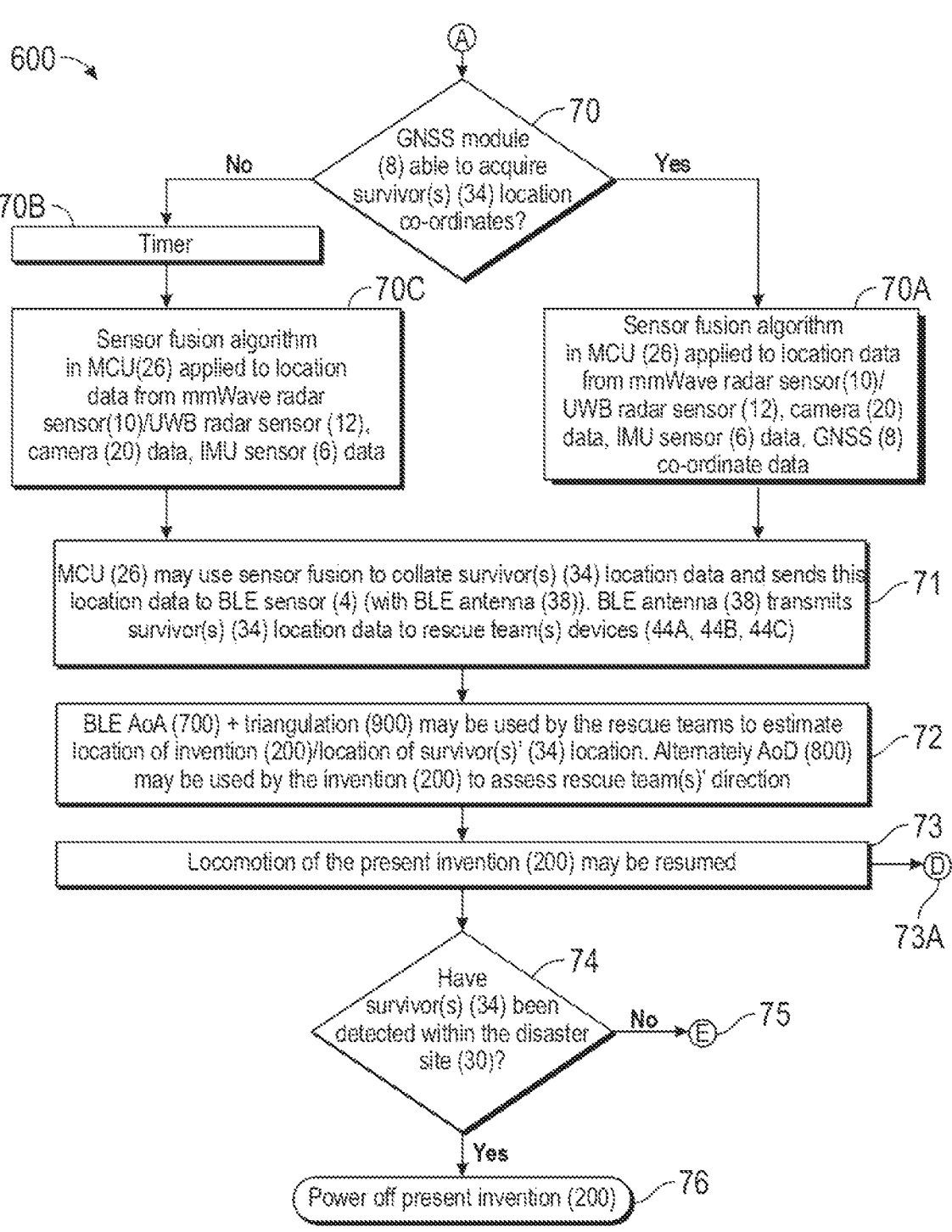

As shown in step 61 in FIG. 6, at the starting/commencement of the rescue mission, it may be recommended the rescue team(s) may mark at least 4 GNSS co-ordinates sufficiently distanced from each other along/around the boundary/periphery of the rescue site (32)/disaster site (30). The rescue team may then mark/note the initial GNSS co-ordinates from a fixed initial/starting reference position on the disaster-affected site (30, 32). The same fixed starting reference position on the disaster-affected ground area (30, 32) which is used to note the GNSS co-ordinates may also be referenced/marked/noted as the initial frame of reference for the Inertial Measurement Unit (IMU) sensor (6) of the invention (200) to be able to estimate the relative orientation and/or angular velocity and/or relative acceleration data of the present invention (200) (i.e., IMU (6) data may be considered to be initialized from point of rescue mission commencement).

As shown in step 60A in FIG. 6, the mobile robot/present invention (200) may be powered on using the DC battery power supply (24) within the present invention (200), to start the operation of the present invention (200). The present invention (200) may begin its locomotion using its actuator-driven pivot-jointed (14*b*) limbs (14*i*)/segmented (14*a*) limbs (14*i*) of the present invention (200) on/along the disaster-affected area (30, 32) to search for survivor(s) (34) trapped under debris (30).

As shown in step 62 in FIG. 6, the video feed/image of the disaster site (30, 32)/disaster scenario may start streaming to the rescue team(s) via Wi-Fi.

As shown in step 63 in FIG. 6, the flashlight (16) on the present invention (200) may be switched on by MCU's (26) command to the flashlight (16). The flashlight (16) may stay on for the duration of the rescue mission (this may be optional based on the rescue team(s)' discretion).

Thereafter, as shown in step 64 in FIG. 6, the present invention (200) may start its locomotion in the direction of survivor(s)' (34) presence detection.

If survivor(s)' (34) i.e., live presence (34) may be present under the debris (30, 32)/behind walls (30, 32), the mmWave radar sensor (10) and/or the UWB solution (12) on the present invention (200) may detect vital signs such as heartbeat rate and/or respiratory function(s) and/or breathing rate and/or pulse rate and/or other such vital signs of the survivor(s) (34). As shown in steps 65 & 66 in FIG. 6, the mmWave radar sensor (10) through (222) and/or the UWB solution (12) through (225) on the present invention (200), may send an indication to the MCU (26) of the present invention (200) that a survivor (live presence) (34) has been detected under/beneath the debris (30, 32)/behind walls (30, 32).

Upon detection of trapped survivor(s) (34) by the present invention (200), the mmWave radar sensor (10) may measure the range (distance) and direction (angle) of the trapped survivor(s) (34) relative to the location of the present invention (200) within the disaster site (30)/rescue site (32).

The relative range and relative angle data of the survivor(s) (34) so measured by the mmWave radar sensor (10) may be referred to as mmWave radar sensor (10) location data 'D1', which it (10) may send (222) to the MCU (26) for data analysis and processing (as shown in step 65A in FIG. 6). The number of survivor(s) (34) (single survivor (34) or multiple survivor(s) (34)) detected by the mmWave radar sensor (10) may depend on the operating frequency, sensor modalities and/or field-of-view (FoV) of the mmWave radar sensor (10) which may have been selected to be housed on the present invention (200). Advanced mmWave radar sensors (10) may have the capability to do the survivor(s) (34) location data processing within the mmWave radar sensor (10) itself.

In case of survivor(s) (34) detection by the UWB sensor (12) on the present invention (200), the UWB solution (12) of the present invention (200) calculates the range and direction (angle) of the trapped survivor(s) (34), relative to the location of the present invention (200) within the disaster-affected site (30, 32). The location data estimated by the UWB solution (12) may be referred to as 'D2'. This location data of trapped survivor(s) (34) estimated by the UWB solution (12) of the present invention (200) may get sent (225) to the MCU (26) for data analysis and processing. Advanced UWB sensors (12) might have advanced signal processing capabilities and hence in future might be able to process the estimated range and direction data within the UWB sensor (12) itself.

As shown in steps 65A & 66A in FIG. 6, once the MCU (26) of the present invention (200) receives an indication of live presence (34) detection from the mmWave radar sensor (10) and/or from the UWB solution (12) on the present invention (200), the movement of the mobile robot (200) (i.e., the signal from MCU (26) to actuators (14*b*)) may be halted temporarily. This may be done to compute/estimate/assess the location of trapped survivor(s) (34) using location data collated from the on-board sensors (10, 12, 8, 6, 20) housed on the present invention (200) and to communicate the collated location data of the trapped survivor(s) (34) to the rescue team(s)' devices (44A, 44B, 44C) for ensuing needful action of survivor(s)' (34) rescue by the rescue teams.

Once the MCU (26) receives an indication of detection of trapped live survivor(s) (34) from the mmWave radar sensor

(10) and/or from the UWB sensor (12), the MCU (26) triggers the GNSS solution (8) of the present invention (200) (the MCU (26) might wake-up the GNSS (8) module, in case the GNSS module (8) may be in sleep mode) so that the GNSS module (8)/GNSS solution (8) may try to obtain localization information about the present invention's (200) location within the disaster-affected site (30, 32), as shown in step 67 in FIG. 6.

Once the GNSS solution (8) receives the command from the MCU (26), the GNSS solution (8) on the present invention (200) may try to acquire location co-ordinates of the present invention (200) within the disaster-affected site (30), as shown in step 70 in FIG. 6. The location of the trapped survivor(s) (34) and/or the location of the present invention (200) may be under the debris (30)/under the ground level where the GNSS satellite signal may not always be able to reach the present invention's (200) location.

As shown in step 70A in FIG. 6, if the GNSS solution (8) of the present invention (200) may be able to successfully acquire GNSS co-ordinates of the present invention (200), the location co-ordinate data which may be referred to as 'D3' which has been successfully acquired by the GNSS solution (8) may get transmitted (226) to the MCU (26) for data analysis and processing. There might exist/exists possibility/possibilities that GNSS receivers (8) in future may be able to perform location data processing within the GNSS module (8) itself, owing to advanced digital signal processing capabilities.

As shown in step 68 in FIG. 6, the image/video data captured by the visual sensing solution (20) at the time instant of survivor(s)' (34) detection may be sent from the Wi-Fi enabled camera (20) module on the present invention (200) to the rescue teams on the rescue team's devices (44A, 44B, 44C). The video/image footage/feed can be viewed on a display/visualization app on the rescue team's devices (44A, 44B, 44C). The data acquired by the camera (20) module on the present invention (200) at the instant of survivor(s)' (34) detection may be regarded as 'D4' and may be sent (223) to the MCU (26) for (further) analysis and processing. Sophisticated camera (20) modules, if used on the present invention (200), may incorporate advanced digital signal processors (DSPs) with sophisticated image/video processing algorithms and may therefore be able to process the captured data 'D4' within the camera (20) module itself. This processed data 'D4' may be then sent (223) to the MCU (26) for algorithms to perform sensor fusion on camera (20) data along with data from other sensors on board the present invention (200).

As shown in step 69 in FIG. 6, the inertial navigation sensor IMU (6) data i.e., the position data (pose data) of the present invention (200) determined by the IMU (6) at the current position/current location of the present invention (200) and/or the IMU's (6) position data (pose data) at the particular time instant of survivor(s)' (34) detection may be regarded to be 'D5' and may get sent (227) to the MCU (26) of the present invention (200) for data analysis and processing. Drifts within IMU (6) arising from accumulated gyroscope errors may need to be accounted for, during data analysis and processing.

As shown in step 70 in FIG. 6 of (600), it is checked if the GNSS (8) solution has been able to acquire location co-ordinates of the present invention (200). Since the update rates of GNSS may be slow and since saving as many trapped survivors (34) as possible is of paramount importance and needs to be expedited, a timer may be used in the MCU (26) of the present invention (200) as shown in step 70B in FIG. 6. The timer may be used to instruct the MCU (26) to wait for a specified time period/time duration (possibly on the order of ~5 seconds) to receive GNSS (8) data 'D3' from the instant GNSS (8) is triggered.

As shown in step 70C in FIG. 6, if the GNSS co-ordinate data 'D3' may fail to arrive at the MCU (26) before the timer of step 70B elapses, the MCU (26) on the present invention (200) may process the location data 'D1' from the mmWave radar sensor (10) and/or location data 'D2' from the IR-UWB radar sensor (12) and location data 'D4' from the visual sensing module (20) and location data 'D5' from the inertial navigation sensor IMU (6), based on the collated sensor location data processing algorithm in the MCU (26) and/or how the MCU (26) may have been programmed. In case a new survivor (34) gets detected while the movement of the mobile robot (200) is halted and the location data of the latest detected survivor (34) needs processing by the MCU (26), interrupts may be used by the MCU (26) of the present invention (200).

The collated survivor(s) (34) location information of detected trapped survivor(s) (34) may be considered to be 'E' and may be considered to comprise of:

a) Data 'D1' and/or Data 'D2': The best possible estimate of the trapped survivor's(s) (34) range and direction, relative to the location of the present invention (200) within the disaster-affected site (30) may be provided by: either the mmWave radar sensor (10) i.e., 'D1' or by the UWB solution (12) i.e., 'D2' or by the intelligent sensor fusion processing of the range and direction data 'D1' fused with 'D2', obtained from the mmWave radar sensor (10) and the range and direction data obtained from the UWB solution (12) of the present invention (200).

b) Data 'D3' and/or [Data 'D4' and Data 'D5']:

(i) As shown in step 70A in FIG. 6, if the GNSS solution (8) has been able to acquire the GNSS coordinates of the location of the present invention (200) within the disaster-affected site (30), this GNSS (8) location data 'D3' may be intelligently fused using SLAM (Simultaneous Localization and Mapping) techniques and/or sensor fusion algorithms, along with the mmWave radar sensor (10) data 'D1' and/or UWB radar sensor (12) data 'D2' and camera (20) data 'D4' from the camera (200) module and the location data 'D5' from the inertial navigation sensor/IMU (6) of the present invention (200).

(ii) As shown in step 70C in (600) in FIG. 6, in case the GNSS solution (8) may have failed to acquire the location co-ordinates of the present invention (200), mmWave radar sensor (10) data 'D1' and/or UWB radar sensor (12) data 'D2' and the camera (20) data 'D4' and the inertial navigation sensor IMU (6) data 'D5' may be intelligently fused using SLAM techniques and/or other sensor fusion techniques in order to estimate the location of the present invention (200).

Sensor data fusion algorithms such as Extended Kalman Filtering (EKF) may be used by the MCU (26)/algorithm(s) of the present invention (200) in order to augment and enhance the location data 'E' of the detected trapped survivor(s) (34), which might be obtained by intelligently and intelligibly fusing location information obtained from: the camera (20) module, orientation and mapping data from the inertial sensors IMU (6), range and angle data from the millimeter-wave radar sensor (10), range and estimation data measured by the UWB solution (12) and the GNSS co-ordinate location data (if acquired) by the GNSS solution (8) of the present invention (200), as shown in step 70A and 70C in FIG. 6 of (600).

The MCU (26) of the present invention (200) may then send (224) this intelligently fused comprehensive location data 'E' of trapped survivor(s) (34) to the BLE solution (4) on the present invention (200), as has been shown in step 71 in FIG. 6. The BLE antenna (38) on the BLE solution (4) of the present invention (200) may then be used to transmit the collated location data 'E' to the rescue teams for calculation of best estimate of survivor(s)' (34) location and location of present invention (200) within the disaster-affected site (30, 32). Simultaneously at the same time stamp, the video/image footage of the landscape/scene at the disaster site (30, 32) may be transmitted/sent to the rescue teams' devices (44A, 44B, 44C) using Wi-Fi technology. The number of BLE-enabled rescue devices (44A, 44B, 4C) mentioned herein may merely be to illustrate an example that the rescue team(s) may use three BLE-enabled rescue devices namely. 44A, 44B and 44C. The number of BLE-enabled rescue devices (44A, 44B, 4C) mentioned herein may, by no means be construed as limiting on the maximum/total number of BLE-enabled rescue devices that may be used by the rescue team(s) (the maximum number of BLE-enabled rescue devices used by the rescue team(s) may be as is allowed and specified by the Bluetooth® specification).

As shown in step 72 in FIG. 6, to assess direction of the trapped survivor(s) (34), the present invention (200) aims to leverage the direction-finding feature of Bluetooth® Low Energy (BLE) 5.1 technology (utilizing BLE 5.1 Angle-of-Arrival (AoA) method (700) and/or BLE 5.1 Angle-of-Departure (AoD) method (800)) in addition to the Received Signal Strength Indication (RSSI) distance measurement in order to provide an enhanced, more accurate estimate of trapped survivor(s)'s (34) location and/or location of invention (200) within the disaster-affected site (30) to the rescue team(s). The Bluetooth® 5.1 specification specifies a Constant Tone Extension (CTE) direction-finding signal along with the Bluetooth 5.1 packet (in this case the term "packet" might refer to collated location data) to be transmitted to the BLE-enabled rescue devices (44A, 44B, 44C) of the rescue team(s).

Each BLE-enabled rescue device (44A, 44B, 44C) may house an antenna array consisting of 'n' antenna elements. In the example illustrated for AoA in FIG. 7 and in the example illustrated for AoD in FIG. 8, the rescue device (44A) may house an RF switch (48A) and a uniform linear antenna array consisting of 3 antenna elements (36A1, 36A2, 36A3).

The antenna elements (36A1, 36A2, 36A3) of BLE-enabled rescue device (44A) may be placed next to each other such that the spacing between any two successive antenna elements (36A1, 36A2, 36A3) may not exceed a distance of $\lambda/2$, where '$\lambda$' is the wavelength of the incoming Bluetooth RF signal in meters and is mathematically equal to c/f, where 'c'=speed of light in meters/second ('m/s') and 'f' is the operating frequency of the Bluetooth RF signal in Hz. Therefore, it may mean to be understood that the spacing between antenna elements (36A1, 36A2) of BLE locator (44A) may not exceed $\lambda/2$ meters and the spacing between antenna elements (36A2, 36A3) of BLE locator (44A) may not exceed AJ2 meters. In the case of using BLE, the Bluetooth RF signal frequency may be ≈2.4 GHz, therefore $\lambda$=0.125 m (i.e., $\lambda$≈12.5 cm) and $\lambda/2$ which may be ≈6.25 cm.

Figure 7:
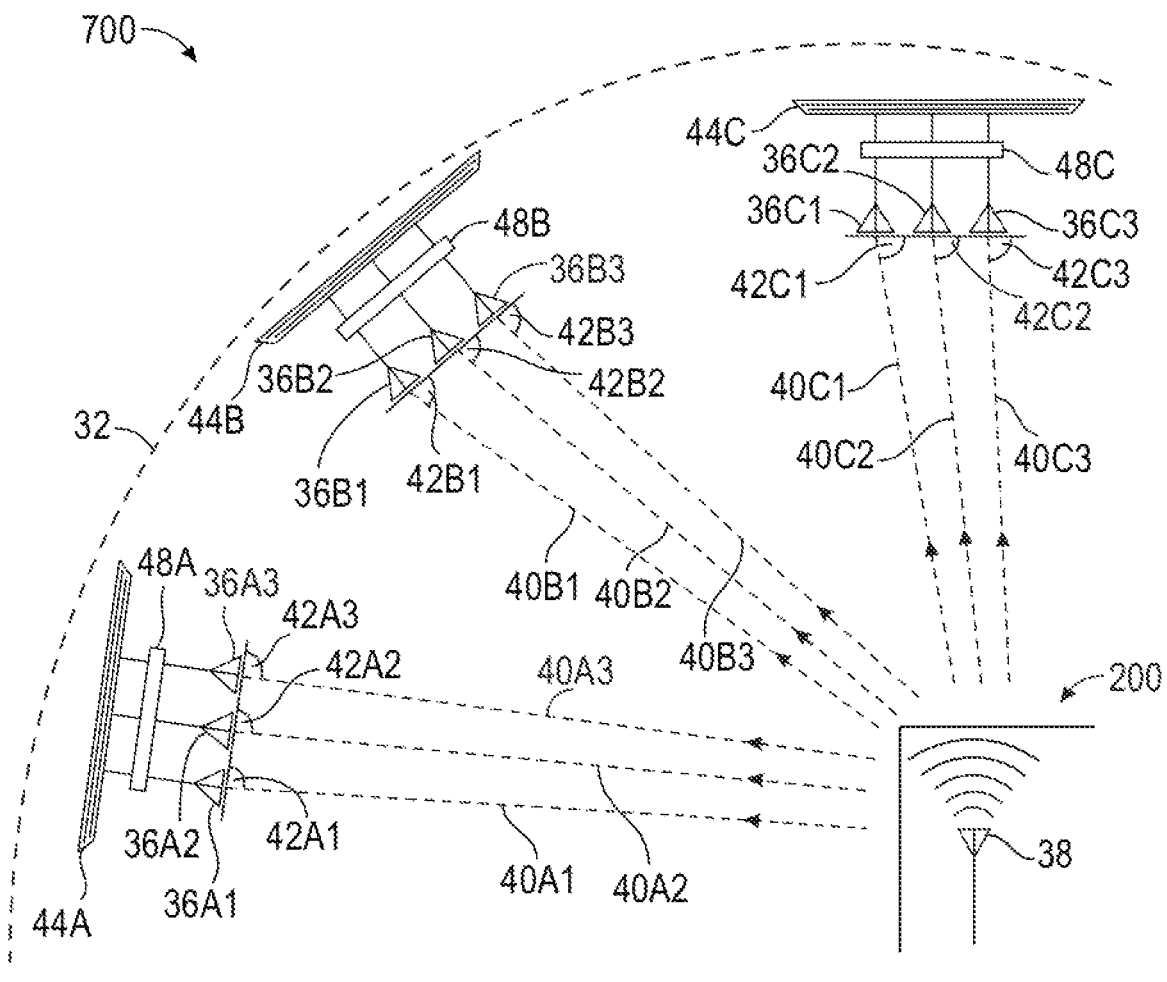
FIG. 7 illustrates Angle-of-Arrival (AoA) method for assessing survivor location using a plurality of BLE receivers.
Figure 8:
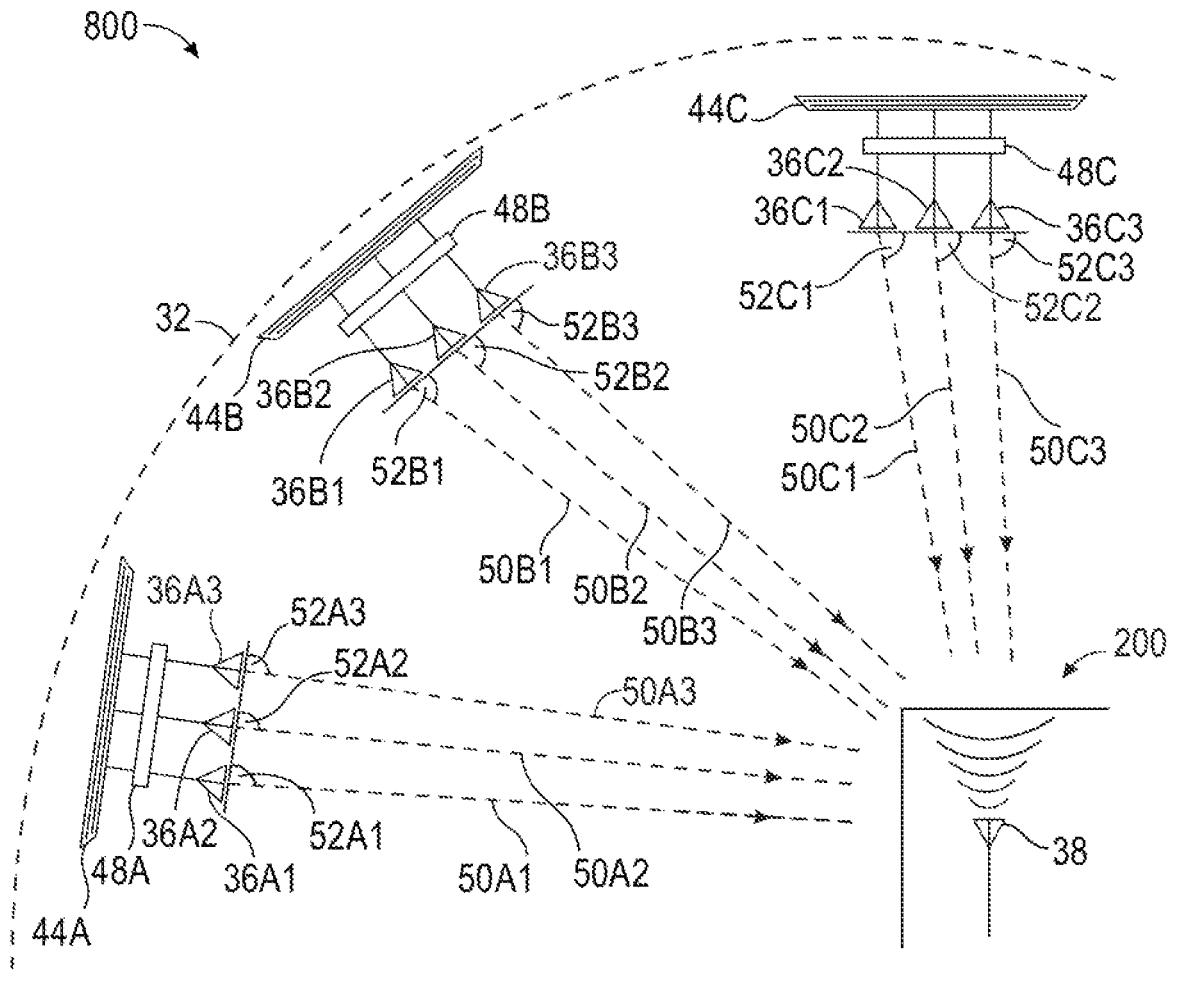
FIG. 8 illustrates Angle-of-Departure (AoD) method for assessing survivor location using a plurality of BLE transmitters.

As shown in the examples illustrated in FIG. 7 and in FIG. 8, the rescue device (44B) may house an RF switch (48B) and a uniform linear antenna array consisting of 3 antenna elements (36B1, 36B2, 36B3). The spacing between antenna elements (36B1, 36B2) of BLE-enabled rescue device (44B) may not exceed $\lambda/2$ 'm' and the spacing between antenna elements (36B2, 36B3) of BLE-enabled rescue device (44B) may not exceed $\lambda/2$ 'm'.

As shown in the examples illustrated in FIG. 7 and in FIG. 8, the rescue device (44C) may house an RF switch (48C) and a uniform linear antenna array consisting of 3 antenna elements (36C1, 36C2, 36C3). The spacing between antenna elements (36C1, 36C2) of BLE-enabled rescue device (44C) may not exceed $\lambda/2$ 'm' and the spacing between antenna elements (36C2, 36C3) of BLE-enabled rescue device (44C) may not exceed $\lambda/2$ 'm'.

As shown in the example illustrated in FIG. 7, the incoming RF signals (40A1, 40A2, 40A3, 40B1, 40B2, 40B3, 40C1, 40C2, 40C3) may get received by the receiver antennas (36A1, 36A2, 36A3, 36B1, 36B2, 36B3, 36C1, 36C2, 36C3) respectively with different amplitudes, at different phases and/or at different times of arrival. This difference in phase of the received signals (40A1, 40A2, 40A3) at an individual element respectively in the antenna array (36A1, 36A2, 36A3) of (44A) and/or the difference in phase of the received signals (40B1, 40B2, 40B3) at an individual element respectively in the antenna array of (36B1, 36B2, 36B3) of (44B) and/or the difference in phase of the received signals (40C1, 40C2, 40C3) at an individual element respectively in the antenna array of (36C1, 36C2, 36C3) of (44C) may provide critical signal magnitude and phase information which can be resolved using trigonometric principles. A minimum of 2 antenna elements may be recommended to be used in the antenna array housed in every BLE-enabled device that the rescue team uses.

The BLE solution (4) on the present invention (200) may first scan and detect the rescue team(s)'s BLE-enabled devices (44A, 44B, 44C) before the rescue mission may begin. Once the rescue team(s)'s BLE devices (44A, 44B, 44C) have been thus scanned and detected, they may then be paired with the BLE solution (4) on the present invention (200) for successful communication and transfer of survivor(s) (34) location information.

Figure 9:
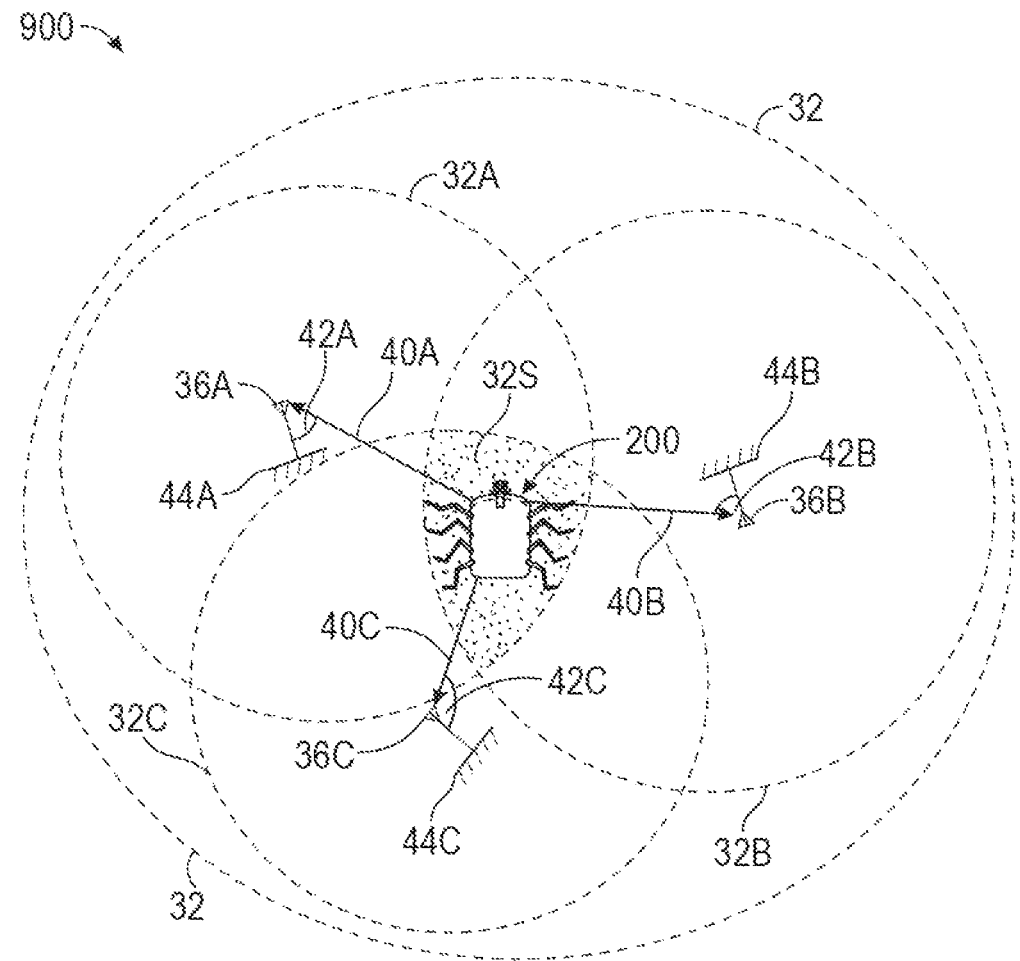
FIG. 9 visually illustrates concepts of triangulation and trilateration used to accurately calculate distance and direction of a target from known positions.

When multiple such AoA measurements (as shown in FIG. 7) and/or RSSI/distance measurements are obtained by the BLE locators (44A, 44B, 44C), the angles-of-arrival (42A1, 42A2, 42A3) at BLE locator (44A) and/or the angles-of-arrival (42B1, 42B2, 42B3) at BLE locator (44B) and/or the angles-of-arrival (42C1, 42C2, 42C3) at BLE locator (44C) may be combined to ascertain the precise location of survivor(s) (34) by finding the common point/point of intersection from where the signals might have been received at the BLE locators (44A, 44B, 44C) using method of triangulation, as shown in FIG. 9.

An application (app) such as a visualization app or exploration tool may be used on any of the rescue team(s)'s devices (44A) or (44B) or (44C) to display the survivor(s)' (34) location co-ordinates and direction information communicated by the BLE solution (4) of the present invention (200) and also to view the images/video feed sent by the WiFi-connected camera (20) of the present invention (200). A. Survivor(s) (34) Location-Tracking/Survivor(s) (34) Direction-Finding Using Angle-of-Arrival (AoA) (700) from BLE (4) on the Present Invention (200) to the Rescue Team(s)' BLE-Devices (44A, 44B, 44C):

FIG. 7 illustrates an example of using AoA method (700) of location-tracking of the present invention (200) using three BLE-enabled rescue devices (44A, 44B, 44C) at the boundary of rescue site (32). For the purpose of tracking location of survivor(s) (34) trapped under the debris (30)

using AoA method (700), the rescue teams at the boundary of rescue site (32) may use Bluetooth® Low Energy (BLE) 5.1-enabled receiver(s) (BLE-enabled/BLE receiver(s)). These BLE-enabled receivers may hereafter be referred to as "BLE locators" (44A, 44B, 44C) and in the example illustrated in FIG. 7, the BLE locators (44A, 44B, 44C) have been shown to be stationed at fixed locations around/at a reasonable periphery around the search-and-rescue area/site (32). It is recommended that a minimum of at least one fixed BLE locator (44A, 44B, 44C) be positioned at known locations around/at the boundary/periphery of the rescue site (32) as illustrated in FIG. 7. The total number of BLE locators (44$x$) wherein "x" denotes number of BLE rescue devices used at the boundary/periphery of rescue site (32) and/or disaster site (30) may depend really upon the geographical area of the disaster-affected site (30) and may depend on the maximum number of Bluetooth Low Energy (BLE) connections to one BLE device which may be allowed and permissible based on the extant Bluetooth® specification. The number of fixed Bluetooth® LE locators (44A, 44B, 44C) and/or the configuration of their placement at the boundary of rescue site (32) may be decided accordingly in order to be able to successfully accommodate all possible use-cases, disaster area geometries, terrain type and/or disaster-effected scenarios. It may not be necessarily required to position the BLE locators (44A, 44B, 44C) at equidistant points around the boundary of the rescue site (32).

In the Angle of Arrival (AoA) method (700) for location-tracking/direction-finding of trapped survivor(s) (34), the BLE antenna (38) on the BLE solution (4) of the present invention (200) may be considered as the transmitter (referred to as "BLE tag"). The BLE locators (44A, 44B, 44C) at the boundary of rescue site (32) may be advanced in hardware complexity and software capabilities compared to the BLE transmitter (4) of the present invention (200). One of the fixed BLE locators either of (44A) or (44B) or (44C) at the boundary of rescue site (32) may have advanced software capabilities and intelligence that might help perform relatively complex calculations such as trilateration/triangulation and/or collect angles-of-arrival (42A1, 42A2, 42A3, 42B1, 42B2, 42B3, 42C1, 42C2, 42C3) computed by the all BLE locators (44A, 44B, 44C) positioned at the rescue site (32).

In the example scenario illustrated in FIG. 7, the BLE antenna (38) on the present invention (200) may transmit the collated location information 'E' along with the CTE to the BLE-enabled rescue devices (44A), (44B), (44C), based on the pairing codes/pairing keys established between the BLE (4) on the present invention (200) and the BLE-enabled rescue devices (44A) & (44B) & (44C).

In FIG. 7 illustrating an example scenario of AoA (700) technique to explain AoA calculation, rescue devices (44A, 44B, 44C) at the boundary of the rescue site (32) may be shown to be receiving/intercepting incoming RF signals (40A1, 40A2, 40A3, 40B1, 40B2, 40B3, 40C1, 40C2, 40C3) from the BLE transmitting antenna (38) of the invention (200).

The RF switch (48A) of BLE locator (44A) may switch between the individual antenna elements (36A1, 36A2, 36A3) to intercept the incoming RF signals (40A1, 40A2, 40A3) respectively. BLE locator (44A) with its antenna elements (36A1, 36A2, 36A3) may receive/intercept the incoming signal (40A1) with angle of arrival (42A1) on antenna element (36A1) and/or may receive the incoming RF signal (40A2) with angle of arrival (42A2) on antenna element (36A2) and/or may receive the incoming RF signal (40A3) with angle of arrival (42A3) on antenna element (36A3). The BLE locator (44A) may collect In-Phase Quadrature-Phase (IQ) samples from the RF signals (40A1, 40A2, 40A3) received on the antenna elements (36A1, 36A2, 36A3) respectively.

The RF switch (48B) of BLE locator (44B) may switch between the individual antenna elements (36B1, 36B2, 36B3) to intercept the incoming RF signals (40B1, 40B2, 40B3) respectively. BLE locator (44B) with its antenna elements (36B1, 36B2, 36B3) may receive/intercept the incoming signal (40B1) with angle of arrival (42B1) on antenna element (36B1) and/or may receive the incoming RF signal (40B2) with angle of arrival (42B2) on antenna element (36B2) and/or may receive the incoming RF signal (40B3) with angle of arrival (42B3) on antenna element (36B3). The BLE locator (44B) may collect In-Phase Quadrature-Phase (IQ) samples from the RF signals (40B1, 40B2, 40B3) received on the antenna elements (36B1, 36B2, 36B3) respectively.

The RF switch (48C) of BLE locator (44C) may switch between the antenna elements (36C1, 36C2, 36C3) to intercept the incoming RF signals (40C1, 40C2, 40C3) respectively. BLE locator (44C) with its antenna elements (36C1, 36C2, 36C3) may receive/intercept the incoming signal (40C1) with angle of arrival (42C1) on antenna element (36C1) and/or may receive the incoming RF signal (40C2) with angle of arrival (42C2) on antenna element (36C2) and/or may receive the incoming RF signal (40C3) with angle of arrival (42C3) on antenna element (36C3). The BLE locator (44C) may collect In-Phase Quadrature-Phase (IQ) samples from the RF signals (40C1, 40C2, 40C3) received on the antenna elements (36C1, 36C2, 36C3) respectively.

The "IQ" samples collected from the received RF signals (40A1, 40A2, 40A3) and/or (40B1, 40B2, 40B3) and/or (40C1, 40C2, 40C3) may hold the phase and magnitude information of the location data 'E' arriving at each antenna element (36A1, 36A2, 36A3) and/or (36B1, 36B2, 36B3) and/or (36C1, 36C2, 36C3) respectively on each BLE locator (44A, 44B, 44C) respectively with different amplitudes and/or at different times and/or with differing phases. The angles (42A1, 42A2, 42A3) and/or (42B1, 42B2, 42B3) and/or (42C1, 42C2, 42C3) at which the RF signals (40A1, 40A2, 40A3) and/or (40B1, 40B2, 40B3) and/or (40C1, 40C2, 40C3) may be respectively received by the BLE locators (44A, 44B, 44C) respectively may be used to deduce the location of the present invention (200) based on phase differences between angles of arrival using trigonometric principles.

The IQ samples may be used by the individual BLE locator (44A, 44B, 44C) for direction estimation/angle estimation by position estimation algorithms If BLE locator (44C) may be considered as an example for angle of arrival calculation, the phase difference between (|42C1|−|42C3|) hit between antenna elements (36C1) & (36C3) may be used to mathematically calculate the angle of arrival using trigonometric principles by taking the BLE frequency of operation (usually BLE frequency≈2.4 GHz), and/or using algorithms such as the beamforming algorithm, MUSIC (Multiple Signal Classification) algorithm, spatial filtering algorithm, etc.

The BLE locators (44A) and/or (44B) and/or (44C) may also perform RSSI calculations to assess the individual respective distance from each BLE locator (44A, 44B, 44C) to the BLE tag (4) on the present invention (200), thereby inferring the distance of the present invention (200) relative to the respective BLE locator (44A, 44B, 44C).

For the purpose of accurately assessing the location of the present invention (200), the rescue team(s) may use Angle-of-Arrival (AoA) technique (700) independently or the rescue team(s) may use Angle-of-Arrival (AoA) technique (700) in conjunction with trilateration/triangulation (900) technique to estimate precise location of the present invention (200), thereby estimating accurately, the location of detected trapped survivor(s) (34). FIG. 9 shows an illustrative example of utilization of concepts of triangulation and/or distance-based estimation of RSSI/trilateration (900) which may be used by the rescue team(s) to assess more accurate & precise location of the present invention (200).

For trilateration calculation (900), the distances between each BLE locator (44A, 44B, 44C) and the present invention (200) may be calculated based on distance-based RSSI measurements, wherein the distance-based RSSI measurements may be made by each (based on strength of RSSI power) individual BLE locator (44A, 44B, 44C) respectively to the present invention's (200) location. The present invention (200) may be localized by geometric concepts, wherein each BLE locator (44A, 44B, 44C) may individually compute the distance from each BLE locator (44A, 44B, 44C) to the present invention (200). The individually computed distances from each BLE locator (44A, 44B, 44C) to the present invention (200) may each respectively be considered to be the radius of a circle, wherein the (hypothetical) circles may be denoted as (32A, 32B, 32C) respectively as shown in FIG. 9. The (hypothetically envisioned) common area of intersection (32S) between three such circles (32A, 32B, 32C) may be used to determine the precise location of the present invention (200) as has been illustrated in FIG. 9.

Triangulation calculation (900) may be accomplished using the angle of arrival computed by the BLE locators (44A, 44B, 44C) and may be utilized by BLE-enabled rescue devices (44A, 44B, 44C) of the rescue team(s) for enhanced location accuracy of the present invention's (200) position within the disaster site (30)/rescue site (32). As shown in FIG. 9, triangulation may be used by trigonometrically using consecutive angles (42A, 42B) arriving via signals (40A, 40B) respectively and/or by trigonometrically utilizing consecutive angles (42B, 42C) arriving via signals (40B, 40C) respectively and/or by trigonometrically utilizing consecutive angles (42C, 42A) arriving via signals (40C, 40A) respectively to the BLE locators (44A, 44B, 44C). Since the distance between any two locators among (44A, 44B) and/or (44B, 44C) and/or (44C, 44A) is fixed and may be known, the BLE-enabled rescue device(s)(44A and/or 44B and/or 44C) may use algorithms and/or trigonometric principles such as the law of sines/Pythagorean Theorem to precisely estimate the present invention's (200) location within the disaster site (30)/rescue site (32), thereby utilizing the triangulation method (900).

B. Alternate Method of Survivor(s) (34) Location-Tracking/ Survivor(s) (34) Direction-Finding Using Anele-of-Departure (AoD) (800) from the Rescue Team(s)' BLE-Enabled Devices (44A, 44B, 44C) to the Present Invention (200):

Angle-of-Departure (AoD) method (technique) (800) may be included as a possible alternative/future technique for location tracking and/or direction-finding of the present invention (200) in cases where BLE (4) and/or the BLE antenna (38) on the present invention (200) may not be able to communicate the location data of detected survivor(s) (34) to the rescue devices (44A, 44B, 44C). In AoD technique (800), the BLE-enabled devices (44A) and/or (44B) and/or (44C) may send periodic direction-finding CTE signals to the BLE antenna (38) on the present invention (200), so that the present invention (200) may be able to estimate its own position relative to the position of the BLE-enabled rescue devices (44A, 44B, 44C). The present invention (200) in such cases (800) may have a high degree of advanced intelligence capabilities for e.g., robotic devices with Machine Learning (ML) and/or Artificial Intelligence (AI) capabilities. The onus of resolving location and/or direction information lies on the present invention (200) itself in such a case (800).

FIG. 8 shows an illustrative example of a scenario wherein AoD method (800) may be used for assessing trapped survivor(s)' (34) location. In the example scenario depicted in FIG. 8, the BLE-enabled rescue devices (44A, 44B, 44C) at the rescue site (32) may now be considered to be transmitters, while the single BLE antenna (38) of the BLE solution (4) on the present invention (200) may be considered to be the receiver.

In FIG. 8, the BLE solution (4) on the present invention (200) may not have been shown explicitly, but the BLE antenna (38) shown in FIG. 8 may be understood to be part of the BLE solution (4) that is housed on/in the present invention (200). In the example scenario (800) of AoD shown in FIG. 8, three BLE-enabled rescue devices (44A, 44B, 44C) may be shown to be positioned/stationed at fixed (known) locations around the periphery/boundary of the rescue site (32). Angle of departure calculation(s) may be done at and by the BLE receiver (38)/BLE solution (4) of the present invention (200).

As shown in FIG. 8, in AoD (800) technique, each BLE transmitter (44A, 44B, 44C) at the rescue site (32) may transmit RF signals (50A1, 50A2, 50A3), (50B1, 50B2, 50B3), (50C1, 50C2, 50C3) respectively to the present invention (200). The RF switch (48A) of BLE-enabled rescue device (44A) may switch between antenna elements (36A 1, 36A2, 36A3) to transmit signals (50A1, 50A2, 50A3) respectively with angles (52A1, 52A2, 52A3) respectively to the present invention (200). The RF switch (48B) of BLE-enabled rescue device (44B) may switch between antenna elements (36B1, 36B2, 36B3) to transmit signals (50B1, 50B2, 50B3) respectively with angles (52B1, 52B2, 52B3) respectively to the present invention (200). The RF switch (48C) of BLE-enabled rescue device (44C) may switch between antenna elements (36C1, 36C2, 36C3) to transmit signals (50C1, 50C2, 50C3) respectively with angles (52C1, 52C2, 52C3) respectively to the present invention (200).

To explain the BLE AoD method (800) of assessment of present invention's (200) location within the disaster site (30)/within the rescue site (32), consider one BLE-enabled rescue device (44A) with 3-element antenna array constituted by antenna elements (36A1, 36A2, 36A3). In order to avoid interference, the RF switch (48A) on the BLE transmitter (44A) routes the RF direction-finding BLE signals (50A1, 50A2, 50A3) from the individual antenna elements (36A1, 36A2, 36A3) respectively at different times to the BLE receiver antenna (38) of the present invention (200). It may be noted that the BLE receiver (38) on the present invention (200) may need to have prior information of the switching sequence & configuration of the antenna array (36A1, 36A2, 36A3) used in the BLE transmitter (44A). The BLE receiver antenna (38) of the present invention (200), upon reception of the BLE RF signals (50A1, 50A2, 50A3) from the transmitter (44A), then resolves angle of departure coming from the transmitter (44A), using direction-finding algorithms. The phase difference for example (|52A1|− |52A3|) between two Radio Frequency (RF) signals (50A1) & (50A3) (transmitted by the antenna array elements (36A1) & (36A3) respectively) of the BLE transmitting rescue device (44A) may be embedded in the In-Phase, Quadrature-Phase (IQ) samples of the received signal (50A1, 50A3) at the BLE antenna (38) of the present invention (200). Trigonometric principles may then be used to calculate the angle of departure from the phase difference of (152A 1|-152A31) information.

In cases wherein AoD method (800) of assessing the location of present invention (200) may be used, the onus of reading the IQ samples and determining the location and/or direction (angle) from the IQ samples may lie on the BLE solution (4) of the present invention (200). Thereby, this may lead to increased complexity of the BLE 5.1 solution (4) used in the present invention (200) and/or increase in the processing power requirements of the present invention (200) and/or increase in computation requirements of the present invention (200). Thereby, the feasibility of using AoD method (800) may therefore depend on: the existential conditions at the disaster site/rescue site (30, 32) and/or on the existential conditions during the rescue mission and/or on the complexity of the BLE solution (4)/MCU (26) algorithm(s) in the present invention (200) and/or on the discretion of the product (200) manufacturer. Also, the present invention (200) may estimate its own position, relative to that of the BLE-enabled rescue devices (44A, 44B, 44C), but may yet still have to communicate this position to the rescue devices (44A, 44B, 44C) to facilitate survivor(s)' (34) rescue.

The present invention (200) may sometimes use triangulation (900) method in conjunction with AoD (800) technique, when using AoD (800) as a location assessment method. The triangulation method (900) used in conjunction with AoD (800) may be conceptually similar to the triangulation method (900) as described in triangulation (900) method used along with AoA (700). However, in case of AoD (800), the BLE receiver antenna (38) on the BLE solution (4) of the present invention (200) may perform calculations on the IQ samples received through signals (50A1, 50A2, 50A3, 50B1, 50B2, 50B3, 50C1, 50C2, 50C3) to assess the direction of transmitters (44A, 44B, 44C). However, this increase in computational complexity of resolving the transmitted angles (52A1, 52A2, 52A3, 52B1, 52B2, 52B3, 52C1, 52C2, 52C3) along with triangulation (900) calculations, by the present invention (200) may lead to increased computational requirements (and/or increased computational complexity) on the BLE solution (4) of the present invention (200) and/or may lead to increased computational requirements (and/or increased computational complexity) on the MCU (26) of the present invention (200).

Irrespective of the angle assessment algorithm/technique used by the rescue team(s)—AoA (700) or AoD (800), that may be used for location-tracking and/or direction-finding of survivor(s) (34), sampling the IQ data samples and resolving the location co-ordinates of trapped survivor(s) (34) from the signals/data received may always be done at the device receiving the BLE signals. This means, in the case of AoA (700) method, the BLE locators (44A, 44B, 44C) may resolve the IQ samples via received signals (40A1, 40A2, 40A3, 40B1, 40B2, 40B3, 40C1, 40C2, 40C3) to estimate the Angle of Arrival from present invention (200) to rescue devices (44A, 44B, 44C); while in the case of AoD (800), the BLE solution (4) of the present invention (200) itself, may resolve the IQ samples received via signals (50A1, 50A2, 50A3, 50B1, 50B2, 50B3, 50C1, 50C2, 50C3) to estimate the Angle of Departure from rescue devices (44A, 44B, 44C) to the present invention (200).

Once the survivor(s)' (34) location may have been thus resolved by the rescue team(s) for their ensuing needful action, the present invention (200) may then be issued command(s) by the MCU (26) of the present invention (200) to resume locomotion (movement) of the invention (200), as shown in step 73 in FIG. 6. As shown in step 73A in FIG. 6, the present invention (200) may move in the direction of the nearest survivor(s) (34) with the strongest detectable vital sign(s).

As shown in step 74 in FIG. 6, it may be checked whether all survivor(s) (34) within the disaster site (30)/rescue site (32) have been detected. In case all survivor(s) (34) may not have been detected as shown in step 75 in FIG. 6, the live presence detecting radar sensor(s)(10, 12) may search for survivor(s) (34) as shown in steps 65B & 66B in FIG. 6.

As shown in step 76 in FIG. 6, once all survivor(s) (34) within the disaster area/rescue site (30, 32) may have been detected/rescued, thereby signifying successful completion of the rescue mission, the present invention (200) may be stopped (powered off), based on algorithm/programming of the present invention (200) and/or by command from the rescue team(s).

Since application(s) of the present invention (200) focus on the detection and position-estimation of live presence (34) using the combined technological capabilities of sensors such as mmWave radar sensor (10), IR-UWB radar sensor (12), camera (20), inertial sensor(s) (6) and GNSS solution (8) (if location co-ordinate data is/are acquired by the GNSS solution (8)), based on data fused from the mmWave radar sensor (10), UWB radar sensor (12), camera (20) sensor, IMU sensor (6), GNSS solution (8) (if location co-ordinates may be so acquired), the algorithm on the MCU (26) may be so programmed/coded in the present invention (200) such that the mobile robot (2)/(200) may travel in the direction where the next survivor(s) (34) may be present (as shown in step 64 of FIG. 6).

The possibility of using multiple such robotic devices (200) (i.e., using a plurality of embodiments of the present invention (200) for search-and-rescue mission(s)) to scout for disaster survivor(s) (34) within a relatively larger disaster area (30) may be a point of consideration for the future. The rescue devices (44A, 44B, 44C) may differentiate between each individual search-and-rescue robotic device (200) among multiple such search-and-rescue robotic devices (200), based on the individual/unique Bluetooth identifier of BLE solution (4) on each robotic device (200). In case multiple mobile robotic devices (200) i.e., multiple materializations (embodiments) of the present invention (200) may be decided to be used in future, collision avoidance algorithms may need to be added or incorporated into the detection robotic devices (200).

Further improvements and/or technological advancements to concept(s)/component(s)/module(s) in the future may be possible as use in the present invention (200), but it may be advised that any changes made to the present invention (200) may be made without deviating from the scope of the disclosure as related to the functionality of the present invention (200).

Advantages of the Present Invention (200)

Since the proposed invention (200) may be designed with the dimensions on the order of a few centimeters, the invention may be of small form factor or size and hence may be easily portable across locations anywhere in the world where an earthquake/building collapse/landslide/avalanche may have occurred.

The mobile robotic device (200) may use lightweight electronic components, a factor which might add to its ease-of-use and relatively easy portability factor and hence may be easily transported via any mode of transport without the risk or fear of equipment/personnel damage.

The processing of detection sensor (10, 12) data, location data and direction data of trapped survivor(s) (34) may be done at the present invention (200) itself (i.e. the data/ information processing of sensor (6, 10, 12, 20) and/or GNSS (8) location data and/or BLE (4) data may be performed at the edge itself) and may not require connection to a cloud or server node.

The proposed invention (200) may be designed using power-efficient detection sensing module(s) (6, 10, 12, 20), power-efficient microcontroller (26) & low-power BLE solution(s) (4). Therefore, the invention (200) may be designed as a potentially power-efficient device and therefore may be designed to last several years (depending on conditions such as frequency of use, terrain conditions, etc.).

Another advantage of the proposed invention (200) is that the search and rescue device (200)/invention (200) may be designed and/or manufactured using electronic components that may be easily available in the semiconductor/electronics industry. This might make the invention (200)/device (200) viable for easy single unit production and/or mass production.

Another advantage of the proposed invention (200) may be that it (200) may be designed and/or manufactured towards search and rescue device (200)/invention (200) using electronic components that may be relatively inexpensive to procure while designing the device (200) or during possible mass production of the device (200). This might prove cost-effective for single unit and/or mass production of the said invention (200).

The present invention (200) may be encased around a robot body (2) or chassis (2) which may be made of safe fire-resistant materials. Therefore, the idea of using the present invention (200) may be so that it (200) does not pose a safety risk or hazard to human personnel or rescue teams and may be safe to handle/operate.

I claim:

1. A bio-inspired autonomous mobile robotic device (200) for disaster rescue, wherein the device (200) comprises:
   a plurality of limbs (14*i*) attached to a chassis body (2) rendering the mobile robot device (200) capable of locomotion;
   the limbs (14*i*) of the mobile robot (2) includes actuators (14*b*) for controlling at least one motion of the robotic device (200);
   at least one on-board 360° rotating visual sensing module (20) mounted on a vertical retractable pedestal (20*a*) for capturing images/video footage of a disaster site (30);
   a Global Navigation Satellite Systems (GNSS) solution (8) to obtain location co-ordinates of the device (200) at the said disaster site (30);
   an Inertial Measurement Unit (IMU) (6) with a minimum of 6 DoF (Degrees of Freedom) to aid in the purpose of the mobile robot's (200) localization and self-orientation within the disaster site (30);
   at least one flashlight (16) for illuminating the said disaster site (30) and facilitating extrication/evacuation of survivor(s) (34) by a rescue team;

a microcontroller unit (MCU) (26) for controlling movement of the mobile robot (200), camera (20), IMU (6), flashlight (16) operations;
   wherein,
   at least one millimeter-wave radar sensor (10) for detecting survivor(s) (34) at the disaster site (30);
   at least one Impulse Radio Ultra Wide-Band (IR-UWB) radar sensor solution (12) for detecting survivor(s) (34) at the disaster site (30);
   Bluetooth® Low Energy (BLE) solution (4) with direction-finding feature, for locating survivor(s) (34) at the disaster site (30),
   the millimeter-wave radar sensor (10) and the Impulse Radio Ultra Wide-Band radar sensor solution (12) detect changes in the vital signs of survivor(s), the vital signs include at least one of heart rate, breathing rate, pulse rate,
   the MCU (26) processes using sensor fusion, the data, received from the millimeter-wave radar sensor (10), the Impulse Radio radar sensor (12), camera (20), the GNSS solution (8), and IMU (6) for obtaining localization and information regarding the location of the trapped survivor(s) (34), and
   the millimeter-wave radar sensor (10), UWB radar sensor (12) and the camera (20) deduce the existence of survivor(s) (34) at the disaster site (30)/rescue site (32) and thereby the next path/direction of movement of the present invention (200) may be determined.

2. The device (200) as claimed in claim 1, wherein the device (200) is transportable and is enabled to navigate and move through crevices, nooks and corners and under debris.

3. The device (200) as claimed in claim 1, wherein the device (200) detects the change in vital signs of survivor(s) (34), and assesses the distance, velocity and angle of survivor(s) (34), relative to the location of the device (200).

4. The device (200) as claimed in claim 1, wherein the MCU (26) sends sensor-fused location data of survivor(s) (34) to the BLE solution (4) and wherein the BLE solution (4) is housed with an antenna (38), which communicates the trapped survivor(s)'s (34) location data with the rescue teams.

5. The device (200) as claimed in claim 1, wherein the device (200) communicates with a plurality of BLE-enabled rescue devices (44A, 44B, 44C), which are positioned at conducive locations around the periphery of the disaster site/rescue site (30, 32).

6. The device (200) as claimed in claim 1, wherein the devices (44A, 44B, 44C) estimate the direction and distance of the survivor(s) (34), using either BLE Angle-of-Arrival (AoA) (700) or BLE Angle-of-Departure (AoD) (800) techniques for accurate location-tracking of detected survivor(s) (34).

7. The device (200) as claimed in claim 1, wherein the rescue team uses AoA (700) or AoD (800) for location-tracking and/or direction-finding of survivor(s) (34) using a plurality of terminal devices (44A, 44B, 44C) with the help of trilateration/triangulation (900).

* * * * *